United States Patent
Shorey et al.

(10) Patent No.: US 6,807,159 B1
(45) Date of Patent: Oct. 19, 2004

(54) METHODOLOGY FOR MANAGING POWER CONSUMPTION IN MASTER DRIVEN TIME DIVISION DUPLEX WIRELESS NETWORK

(75) Inventors: Rajeev Shorey, New Dehi (IN); Apurva Kumar, New Delhi (IN); Indraneel Chakraborty, Lucknow (IN); Abhishek Kashyap, New Delhi (IN); Anupam Rastogi, New Delhi (IN); Huzur Saran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 09/696,556

(22) Filed: Oct. 25, 2000

(51) Int. Cl.[7] ............................................. H04B 7/185
(52) U.S. Cl. ........................ 370/318; 370/346; 455/574
(58) Field of Search ................................ 370/449, 318, 370/352, 322, 348, 346; 455/574, 343.1

(56) References Cited

U.S. PATENT DOCUMENTS

| | | | |
|---|---|---|---|
| 5,276,680 A | * | 1/1994 | Messenger .................. 370/311 |
| 5,481,733 A | | 1/1996 | Douglis et al. |
| 5,896,561 A | * | 4/1999 | Schrader et al. ......... 455/67.11 |
| 6,192,230 B1 | * | 2/2001 | van Bokhorst et al. ... 455/343.3 |
| 6,275,500 B1 | * | 8/2001 | Callaway et al. ........... 370/449 |
| 6,622,018 B1 | * | 9/2003 | Erekson ...................... 455/420 |
| 6,640,268 B1 | * | 10/2003 | Kumar ........................ 710/46 |
| 6,657,987 B1 | * | 12/2003 | Kumar et al. ............... 370/346 |

FOREIGN PATENT DOCUMENTS

EP     1 045 559 A1     10/2000

OTHER PUBLICATIONS

Garg et al., "MAC Scheduling Policies for Power Optimization in Bluetooth: A Master Driven TDD Wireless System", VTC May 15, 2000, pp. 196–200.

EP Search Report, Application No. EP 01 30 9086, Apr. 17, 2003, pp. 1–2.

* cited by examiner

*Primary Examiner*—Andy Lee
*Assistant Examiner*—Nittaya Juntima
(74) *Attorney, Agent, or Firm*—McGinn & Gibb, PLLC; T. Rao Coca, Esq.

(57) ABSTRACT

A system, method, and computer program product for carrying out the method for managing power consumption in a master driven time division duplex wireless network comprising optimizing power consumption while maintaining quality of service requirements for end-to-end packet delay by adjusting the polling interval for each slave in low power mode based on the incoming traffic at the slave.

33 Claims, 16 Drawing Sheets

METHODOLOGY FOR MANAGING POWER CONSUMPTION IN MASTER DRIVEN TIME DIVISION DUPLEX WIRELESS NETWORK

FIELD OF THE INVENTION

The present invention provides a methodology for managing power consumption in master driven time division duplex wireless network.

BACKGROUND OF THE INVENTION

Mobile devices have limited energy for computing and communications because of the limited battery lifetimes. Conserving battery power in mobile devices is an important consideration in designing protocols for networks with mobile nodes. This issue should be considered through all the layers of the protocol stack, including the application layer. We have addressed the battery power conservation issue at the Media Access Control (MAC) layer.

The chief sources of energy consumption in the mobile unit considered for MAC related activities are the CPU, the transmitter, and the receiver. CPU usage in mobile devices may be reduced by relegating most of the high-complexity computation (related to media access) to the stationary network. Therefore, the focus of our work is on efficient transceiver (i.e., transmitter, receiver) usage.

The radio can operate in three modes: standby, receive and transmit. We call the mode in which the devices can receive and transmit data as active mode. In general, the radio consumes more power in the transmit mode than in the receive mode, and consumes the least power in the standby mode.

For example, the GEC Plessey DE6003[2] 2.4 GHz radio requires 1.8 W in transmit mode, 0.6 W in receive and 0.05 W in standby mode. Also, power consumption for Lucent's 15 dBm 2.4 GHz Wavelan radio is 1.725 W in transmit mode, 1.475 W in receive mode, and 0.08 W in standby mode[3]. Thus the power consumption is much lower in the standby modes. The scheduling algorithm has to be such that the devices remain in the standby mode when there is no data to transmit or receive. A constraint of switching a device to the standby mode is that the end-to-end delays may increase and may violate the Quality of Service (QoS) parameters. Thus the scheduling algorithm has to be such that the end-to-end delays do not violate the QoS parameters.

Further, the switching of a device from active mode (when it can transmit and receive data) to standby mode has overheads as it has to communicate to other devices about its switching. Thus, frequent switching from one mode to another may lead to consumption of more power. The need of minimizing such transitions requires that the device should move to standby mode after determining the expected overhead in switching and comparing it with the power it saves by switching to the standby mode. Thus, the time for which a device goes to the standby mode should be based upon the previous traffic arrival pattern for that device, so that the end-to-end delays satisfy the QoS parameters and the switching among different power modes is not frequent.

A number of approaches for scheduling data traffic in wireless networks have been proposed earlier.

U.S. Pat. No. 5,274,841 describes methods for polling mobile users in a multiple cell wireless network. However the uplink wireless communication is done using CSMA and not TDMA, hence it is not applicable to master driven time division duplex wireless system.

U.S. Pat. No. 5,506,848 describes the demand assignment system and method for mobile users in a community of interest. U.S. Pat. No. 5,297,144 describes the reservation-based polling protocol for wireless data communications network. However, both these patents use policies that are infeasible in limited bandwidth scenario in centrally driven TDMA wireless systems as they lead to wastage of bandwidth and power as devices are in ACTIVE power mode even when they have no data to transmit or receive.

U.S. Pat. No. 4,251,865 describes a polling system for a duplex communications link is discussed where terminal units or slaves are served in fixed order. Such a distribution assumes similar traffic models at each terminal unit and is thus unsatisfactory in power and bandwidth efficiency with scarce resources available in Wireless TDD MAC systems.

In U.S. Pat. No. 6,016,311, there is a dynamic bandwidth allocation scheme which assumes an asymmetric uplink/downlink bandwidth but does not address switching devices to the standby mode and does not discuss any power considerations.

Technical paper "A comparison of MAC protocols for wireless local networks based on battery power consumption"[1] discusses the power consumption of devices for various MAC strategies, but it does not take into account the packet delay and does not contribute any power optimization policy which adapts to the incoming traffic.

U.S. patent application Ser. No. 09/434,583 (issued as U.S. Pat. No. 6,680,909) discusses the MAC scheduling in Bluetooth but it considers the issues of fairness and throughput in a Bluetooth piconet with no considerations of power consumption.

U.S. patent application Ser. No. 09/535,920 (issued as U.S. Pat. No. 6,657,987) discusses Optimal scheduling of connections with-Quality of Service (QoS) constraints in a polling based Media Access Control (MAC) but it does not consider the power consumption of devices.

As indicated above, none of the patents mentioned above consider power optimization and end-to-end packet delays, which are important considerations in wireless systems.

The criteria of transition from ACTIVE to STANDBY mode and vice versa have not been addressed in any prior art.

The OBJECT AND SUMMARY OF THE INVENTION

The object of the present invention is to obviate the above drawbacks by providing a system and method for managing power consumption in master driven time division duplex wireless network using such as Bluetooth and HomeRF using Adaptive probability based Polling Interval (APPI) mechanism to determine the time period for which a device moves to the low power mode.

To achieve the said objective this invention provides a system for managing power consumption in a master driven time division duplex wireless network comprising means for optimizing power consumption while maintaining quality of service requirements for end-to-end packet delay, by adjusting the polling interval for each slave in low power mode based on the incoming traffic at the slave.

The said means comprises an Adaptive Probability based Polling Interval (APPI) mechanism for adjusting the polling interval for each slave device in low power mode.

The said mechanism for adjusting the polling interval includes means for predicting the expected arrival time for the next packet at each slave based on the distribution of the inter-arrival times for the previous packets received at that slave.

The said means for predicting the expected arrival time comprises:

means for learning the number of data bursts that arrive at each slave in particular ranges of inter-arrival times, means for estimating the probability density function of the traffic distribution at each slave, and means for determining the expected time interval for the arrival of the next data burst at each slave for which the probability of occurrence exceeds a defined threshold value.

The said means for learning the number of data bursts is by a means which receives and stores the number of data bursts arriving in particular ranges of inter-arrival times in entries corresponding to said inter-arrival ranges The said means for estimating the probability density function is by a mechanism to analyze the distribution of data packets for different inter arrival time duration.

The said means for estimating the expected time interval for a defined threshold probability is described by:

$$P(t) = {}_0\Sigma^{T_{AS}} H(x) \leq P_{AS}$$

where

P(t) is the probability of arrival of a packet $T_{AS}$ is the inter-arrival time $P_{AS}$ is the threshold probability H(x) is the function describing the number of observed inter-arrival times for each inter-arrival period normalized by the total number of observations.

The slave is switched from active mode to low power mode based on the condition:

$$(T_{AS} - (T_{AS}/\text{deadline}))*P_{RECEIVE} + (T_{AS}/\text{deadline})*P_{TRANSMIT} - T_{AS}*P_{LOW\ POWER} > P_{OVERHEAD}$$

where $T_{AS}$ is the expected inter-arrival time

Deadline is the deadline of service for the slaves in active mode $P_{RECEIVE}$ is the power in received mode $P_{LOW\ POWER}$ is the power in low power mode $P_{TRANSMIT}$ is the power in transmit mode $P_{OVERHEAD}$ is the power overhead of putting the connection into low power mode and reverting it to active mode The said mechanism for adjusting the polling interval in low power mode is based on the tolerance of the connection of the delayed packets and is defined by $$P(t) = {}_0\Sigma^{T_P} H(x) \leq P_B$$

where

P(t) is the probability of arrival of a packet $T_P$ is the polling interval of the slave in low power mode $P_B$ is the probability, which reflects the tolerance of the connection for delayed packets.

H(x) is the function defining the number of observed data bursts for each inter-arrival period normalized by the total number of observations.

The slave is switched from low power mode to active mode based on the condition $$(b-1)*T_{LOW\ POWER} > d$$

where b = the measured burst length $T_{LOW\ POWER}$ = time in the low power mode d = estimated maximum delay of the last packet.

The said master driven time division duplex wireless network is a Bluetooth network in which the said low power mode corresponds to the 'SNIFF' mode.

The present invention also provides a method for managing power consumption in master driven time division duplex wireless network comprising optimizing power consumption while maintaining quality of service requirements for end-to-end packet delay, by adjusting the polling interval for each slave based on the incoming traffic at the slave.

The adjusting of the polling interval is by an Adaptive Probability based Polling Interval (APPI) method for adjusting the polling interval for each slave device.

The said adjusting of the polling interval includes predicting of the expected arrival time for the next packet at each slave, based on the distribution of the inter-arrival times for the previous packets at that slave.

The predicting of the expected arrival time comprises:

learning the number of data bursts that arrive at each slave in particular ranges of inter-arrival times, estimating the probability density function of the traffic distribution at each slave, and determining the expected time interval for the arrival of the next data burst at each slave for which the probability of occurrence exceeds a defined threshold value.

The said learning of the number of data bursts is by a storage method which stores the number of data bursts arriving in particular ranges of inter-arrival times in entries corresponding to said inter-arrival ranges.

The said method for estimating the probability density function is defined by analyzing the distribution of data packets for different inter-arrival time durations.

The determining of estimating the expected time interval for a defined threshold probability is by:

$$P(t) = {}_0\Sigma^{T_{AS}} H(x) < P_{AS}$$

where

P(t) is the probability of arrival of a packet $T_{AS}$ is the inter-arrival time $P_{AS}$ is the threshold probability H(x) is the function describing the number of observed data bursts for each inter-arrival period normalized by the total number of observations.

The said determining of the expected time interval is defined by:

$$(T_{AS} - (T_{AS}/\text{deadline}))*P_{RECEIVE} + (T_{AS}/\text{deadline})*P_{TRANSMIT} - T_{AS}*P_{LOW\ POWER} > P_{OVERHEAD}$$

where $T_{AS}$ is the expected inter-arrival time

Deadline is the deadline of service for the slaves in active mode $P_{RECEIVE}$ is the power in received mode $P_{LOW\ POWER}$ is the power in low power mode $P_{TRANSMIT}$ is the power in transmit mode $P_{OVERHEAD}$ is the power overhead of putting the connection into low power mode and reverting it to active mode.

The interval for adjusting the polling interval in low power mode is based on the tolerance of the connection of the delayed packets and is defined by $$P(t) = {}_0\Sigma^{T_P} H(x) \leq P_B$$

where

P(t) is the probability of arrival of a packet $T_P$ is the polling interval of the slave in low power mode $P_B$ is the probability, which reflects the tolerance of the connection for delayed packets.

H(x) is the function defining the number of observed inter-arrival times for each inter-arrival period normalized by the total number of observations.

The slave is switched from low power mode to active mode based on the condition $$(b-1) * T_{LOW\ POWER} > d$$

where b=the measured burst length $T_{LOW\ POWER}$=time in the low power mode d=estimated maximum delay of the last packet.

The said master driven time division duplex wireless network is a Bluetooth network in which the said low power mode corresponds to the 'SNIFF' mode.

The instant invention further provides a computer program product comprising computer readable program code stored on computer readable storage medium embodied therein for managing power consumption in master driven time division duplex wireless network comprising computer readable program code means configured for optimizing power consumption while maintaining quality of service requirements for end-to-end packet delay, by adjusting the polling interval for each slave based on the incoming traffic at the slave.

The said configured computer readable program code means comprises an Adaptive Probability based Polling Interval (APPI) mechanism for adjusting the polling interval for each slave device.

The said computer readable program code means configured for adjusting the polling interval includes mechanism for predicting the expected arrival time for the next packet at each slave based on the distribution of the inter-arrival times for the previous packets at that slave.

The said mechanism for predicting the expected arrival time comprises:

computer readable program code means configured for learning the number of data bursts that arrive at each slave in particular ranges of inter-arrival times, computer readable program code means configured for estimating the probability density function of the traffic distribution at each slave, and computer readable program code means configured for determining the expected time interval for the arrival of the next data burst at each slave for which the probability of occurrence exceeds a defined threshold value.

The said computer readable program code means configured for learning the number of data bursts is by a storage means which stores the number of data bursts arriving in particular ranges of inter-arrival times in entries corresponding to said inter-arrival ranges.

The computer readable program code means for estimating the probability density function is a means for analyzing the distribution of data packets for different inter arrival time duration.

The said computer readable program code means configured for estimating the expected time interval for a defined threshold probability is defined by:

$$P(t) = {}_0\Sigma^{T_{AS}} H(x) \leq P_{AS}$$

where

P(t) is the probability of arrival of a packet $T_{AS}$ is the inter-arrival time $P_{AS}$ is the threshold probability H(x) is the function describing the number of observed data bursts for each inter-arrival period normalized by the total number of observations.

The said computer readable program code means configured for determining the expected time interval is defined by:

$$(T_{AS} - (T_{AS}/\text{deadline})) * P_{RECEIVE} + (T_{AS}/\text{deadline}) * P_{TRANSMIT} - T_{AS} * P_{LOW\ POWER} > P_{OVERHEAD}$$

where $T_{AS}$ is the expected inter-arrival time

Deadline is the deadline of service for the slaves in active mode $P_{RECEIVE}$ is the power in received mode $P_{LOW\ POWER}$ is the power in low power mode $P_{TRANSMIT}$ is the power in transmit mode $P_{OVERHEAD}$ is the power overhead of putting the connection into low power mode and reverting it to active mode.

The interval for adjusting the polling interval in low power mode is based on the tolerance of the connection of the delayed packets and is defined by $$P(t) = {}_0\Sigma^{T_P} H(x) \leq P_B$$

where

P(t) is the probability of arrival of a packet $T_P$ is the polling interval of the slave in low power mode $P_B$ is the probability, which reflects the tolerance of the connection for delayed packets.

H(x) is the function defining the number of observed data bursts for each inter-arrival period normalized by the total number of observations.

The slave is switched from low power mode to active mode based on the condition $$(b-1) * T_{LOW\ POWER} > d$$

where b=the measured burst length $T_{LOW\ POWER}$=time in the low power mode d=estimated maximum delay of the last packet.

The said master driven time division duplex wireless network is a Bluetooth network in which the said low power mode corresponds to the 'SNIFF' mode.

BRIEF DESCRIPTION OF THE DRAWINGS

The invention will now be described with reference to the accompanying drawings.

DETAILED DESCRIPTION OF THE DRAWINGS

Figure 1:
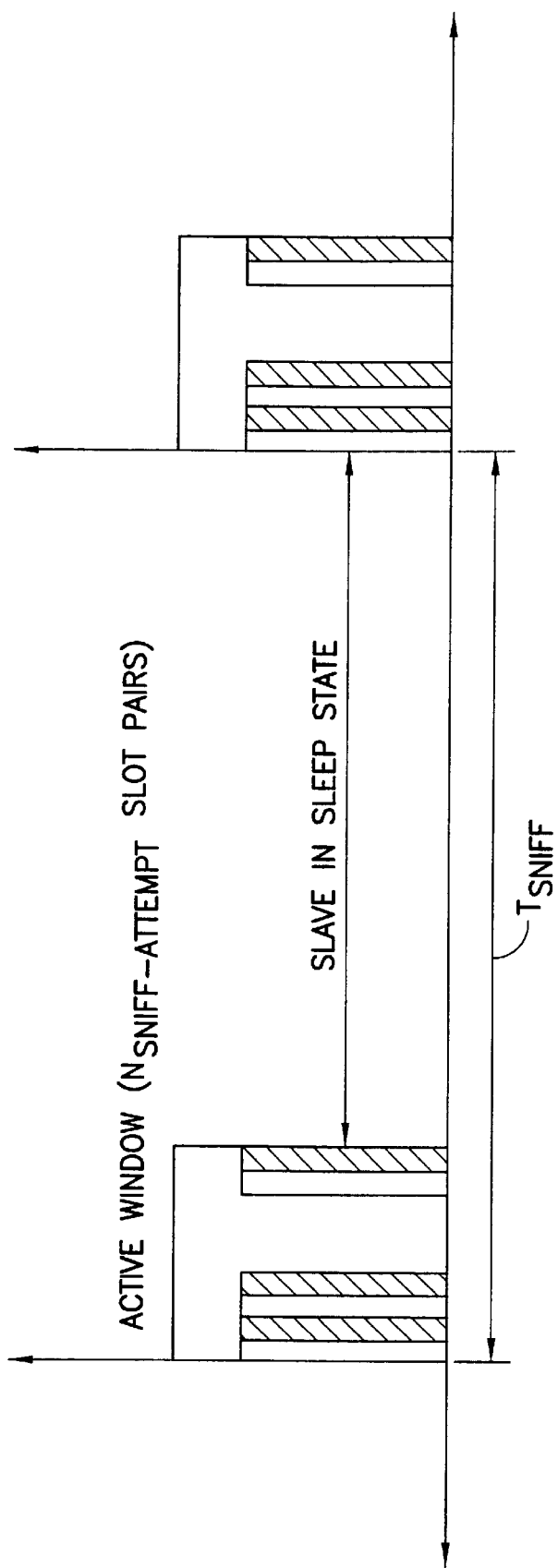
FIG. 1 shows the operation of the SNIFF mode in a Bluetooth system.

FIG. 1 shows the operation of the SNIFF mode in a Bluetooth system. In the SNIFF mode, the slave has to listen for master transmissions in pre decided time slots, thus remaining in low power mode for rest of the time. The time interval after which a master transmits to the slave since the last transmission is known as the polling interval. The slave listens for master transmissions $N_{SNIFF-ATTEMPT}$ times after each $T_{SNIFF}$ slots of time. Thus, the duty cycle of slave's transceiver is reduced in SNIFF mode, leading to power conservation. The switching of a slave to SNIFF mode can be either master initiated or slave initiated. In the master initiated switching, the master either forces a slave to SNIFF mode or it can request a slave to go to SNIFF mode. A slave can either accept or reject the master's request for switching to SNIFF mode. In slave initiated switching, a slave requests the master for its switching to SNIFF mode and if the master accepts the request, the slave is switched to the SNIFF mode.

The desired features of scheduling the slaves in a Bluetooth piconet are the following:

1. The power consumption of the devices must be reduced.

2. It should be ensured that the end-to-end delays must satisfy the QoS parameters.

3. The criteria of switching from active to sniff should reduce unnecessary switching between the power modes.

4. The polling intervals in the sniff mode must be calculated based on previous traffic arrival pattern, so as to resolve the issues 1,2.

Adaptive Probability based Polling Interval (APPI) adapts to the incoming traffic, it performs better that the Fixed Polling Interval (FPI) policy, which uses sniff mode without adapting t incoming, traffic. This technique has two versions:

1) Adaptive Probability based Polling Interval with Fixed resolution (APPI-FR)

2) Adaptive Probability based Polling Interval with adaptive resolution (APPI-AR).

The Adaptive Probability based Polling Interval (APPI) with fixed resolution (APPI-FR) methodology chooses the polling interval $T_{sniff}$ in the LOW POWER mode in a Bluetooth device.

APPI-FR has the following salient features:

i) During inactivity, the slaves get into low power mode for the predicted time till arrival of the next packet, thus reducing power consumption.

ii) Quality of Service Parameters of all slaves including those, which are in SNIFF mode are satisfied.

iii) The end-to-end packet delay is reduced with respect to Fixed Polling Interval policy (FPI) and Mean Variance policy (MEAN).

iv) The polling interval is chosen based on the incoming traffic of that connection.

v) Extra bandwidth is freed for slaves which have more traffic by polling the connections with lesser traffic presently in LOW POWER mode at larger intervals.

vi) To keep the connections for the least possible time in the power-expensive ACTIVE mode.

APPI-FR works by using a learning function H to adapt to the nature of the incoming traffic at the device. The learning function is based on the inter-arrival times between data packets at connections. The resolution of the learning function is the smallest gap between two consecutive polling intervals which can be derived from the learning function by applying APPI. In APPI-FR, the resolution is fixed as per the maximum and minimum inter-arrival values between the packets of the connection.

In APPI-FR the degree of the learning function H is high if a fine resolution is required in determining polling interval for a good approximation of the incoming traffic. This leads to computational overheads while calculating polling interval. For example, the calculation of probability will require adding individual probabilities of each inter-arrival range considered. Thus, if the number of intervals is more, computational costs increase.

Adaptive Probability based Polling Interval with Adaptive Resolution (APPI-AR) overcomes the shortfalls of APPI-FR. APPI-AR handles the traffic arrival distribution by keeping finer resolution of the polling interval in the inter-arrival range where the probability of data arrival is high. The resolution of polling interval of the learning function H is low in the inter-arrival range where the expected probability of data arrival is low. Thus, the degree of the learning function H in APPI-AR is kept constant at a value nearly 20% of that of APPI-FR for similar results.

The advantages of APPR-AR are:

i) Though having lesser degree in the learning function H, this policy works out precise polling as it is adaptive to the traffic arrival distribution.

ii) Traffic of any kind can now be handled without any knowledge about the traffic arrival distribution.

iii) The degree of the function H is also low, hence the computational overheads are avoided without any loss in the resolution of polling interval.

iv) All the advantages of the Adaptive Policy with Fixed Resolution are still available.

The Criteria for the Decision of Switching of Power Modes in APPI

APPI maintains minimal per-flow information and is easy to implement in hardware.

APPI is an easy to implement algorithm to decide the polling time for connections for the low power (SNIFF) mode. In such a case, APPI makes the logical and legitimate assumption that the inter-arrival time till the next packet is drawn from the same distribution as the inter-arrival times, which have been observed so far. Hence the inter-arrival times can be observed to derive the expected time of the arrival of a packet.

To learn the distribution D of the traffic for the given connection, a separate learning function H of the observed inter-arrival times of data bursts is kept for the forward (Master to Slave) and the reverse (Slave to Master) data traffic. The inter-arrival times of data bursts is observed and recorded in the learning function are of the first packet in each burst. Thus the remaining packets of each burst are excluded from the observation as they normally arrive within negligible time-interval of the first packet. For each time-interval $I \in 0 \ldots m-1$, $H(i)$ is the number of observed inter-arrival times in the interval $[i^*M/m, (i+1)^*M/m)$, where the parameter m is the number of entries in H and M is the maximum inter-arrival time for the observation.

Figure 2:
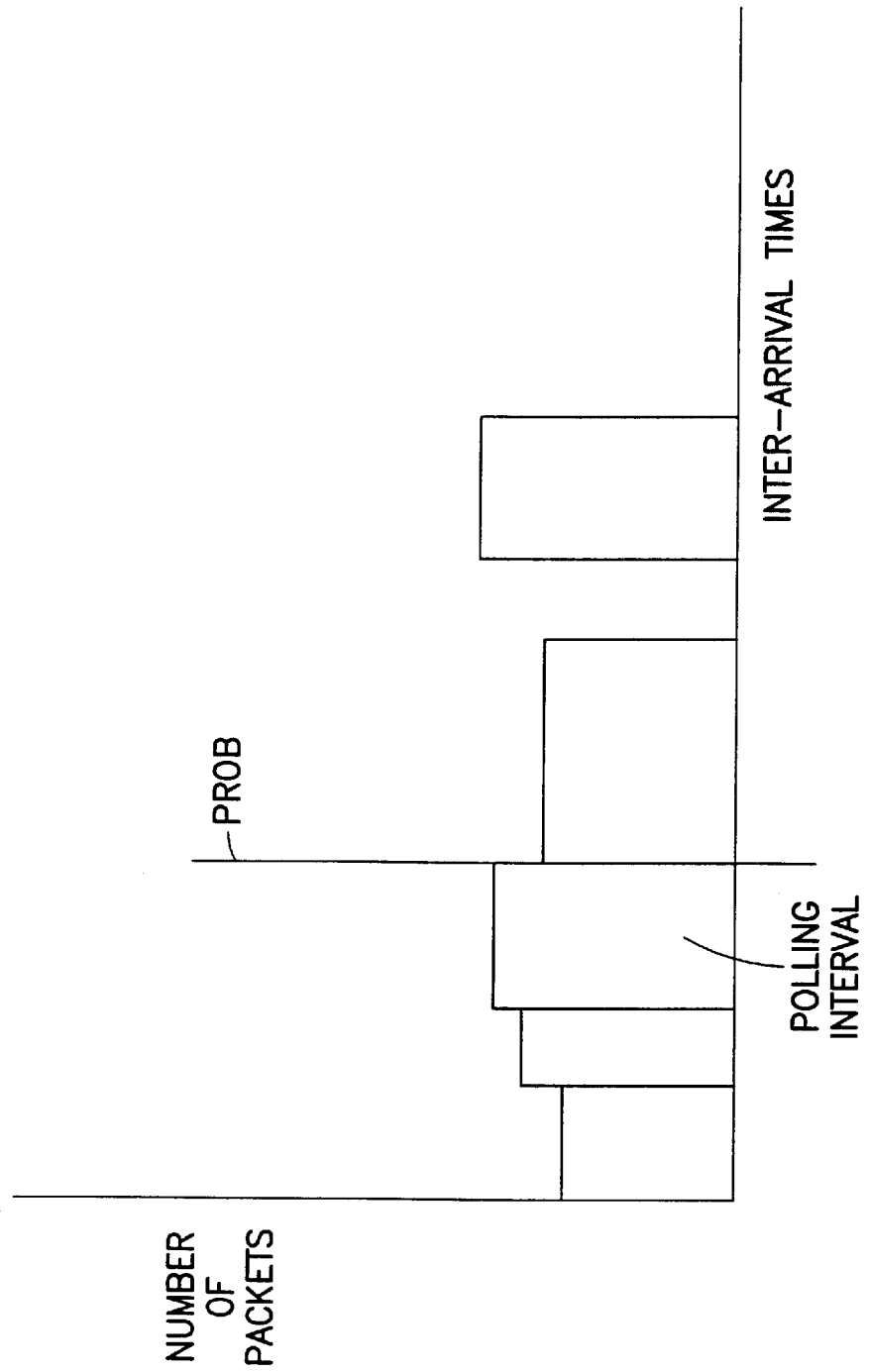
FIG. 2 shows an example of distribution of inter arrival time for data bursts.

The Learning Function:

The learning function stores the number of data-bursts which arrived in particular ranges of inter-arrival times in the entry corresponding to those inter-arrival ranges. FIG. 2 shows a learning function with X-axis representing the inter-arrival time and Y-axis corresponding to the number of bursts which arrived with in those inter-arrival ranges.

Condition of Low Power mode:

When a connection is in ACTIVE mode and a data-burst ends, the aim is to calculate the time $T_{AS}$. $T_{AS}$ should be chosen such that the probability of the arrival of the next data-burst of sufficient length within this time ($T_{AS}$) which can force (because of QoS requirements over individual packet delay) the connection into ACTIVE mode (if it is put into Low Power mode now) is less than a threshold $P_{AS}$. This prediction is done with the help of the learning function H. Such bursts which make the ACTIVE mode indispensable for their service are the only packets considered for the calculation of the probability P(t), where the meaning of P(t) is described below.

Thus if the probability P(t) of the arrival of such a packet crosses a threshold $P_{AS}$ when added upto a time $T_{AS}$, (where $P_{AS}$ depends on the tolerance of the QoS parameters allowed), and the power overhead V of putting the connection into SNIFT mode and reverting it back to ACTIVE mode is less than the power saved in the time $T_{AS}$, the connection is put into Low Power mode.

The probability density function of the traffic distribution D is estimated by the learning function H, and $T_{AS}$ is the inter-arrival time to be derived from D, the power to transmit is $P_{TRANSMIT}$ per slot, to receive is $P_{RECEIVE}$ and the power in sniff state is $P_{SNIFF}$, then the above conditions can be represented as $$P(t) = {}_0\Sigma^{T_{AS}} H(x) = P_{AS} \quad \text{(i)}$$

$$(T_{AS} - (T_{AS}/\text{deadline}))^* P_{RECEIVE} + (T_{AS}/\text{deadline})^* P_{TRANSMIT} - T_{AS}^* P_{LOW\ POWER} > P_{OVERHEAD} \quad \text{(ii)}$$

Thus if the second condition is satisfied for the connection for the $T_{AS}$ calculated from the first condition, then the slave is sent to Low Power mode.

Deciding the polling interval in LOW POWER mode: The second aim is to find a time-interval such that the expected time-interval before the arrival of the next burst is greater than a probability $P_B$ which reflects the tolerance of the connection for delayed packets. Thus, $$P(t) = {}_0\Sigma^{T_P} H(x) \leq P_B$$

This $T_P$ is the polling interval of the slave in Low power mode, $T_{LOW\ POWER}$.

FIG. 2 describes an example of distribution of inter-arrival times for data packets. To decide the polling interval, the number of packets lying in different inter-arrival ranges are added over the inter-arrival ranges starting from the beginning till their sum becomes equal to $P_B$ (<1) times the total number of bursts. The mean of the last inter-arrival range reached in above procedure is taken as the polling interval. $P_B$ is represented as PROB in FIG. 2. The values of PROB for good performance of APPI are determined by performing simulations for different traffics like FTP, HTTP etc. The higher is the value of PROB, the more will be the packet end-to-end delays. Thus, the value of PROB should be low for connections requiring strict QoS adherence. Thus, the value of PROB may be a parameter of QoS as it represents the packet delays.

Approximation of the traffic distribution D: The distribution of the incoming traffic is appropriated by a learning function H of the inter-arrival times of the data packets.

Deciding the criterion of switching from LOW POWER to ACTIVE mode: If a packet being served in the LOW POWER mode is estimated to get a delay higher than a threshold which again depends upon QoS, then the connection is immediately put into ACTIVE mode. This is done easily by measuring the burst length b, the sniff-interval $T_{SNIFF}$ and thus estimating the maximum delay d of the last packet in the queue.

$$\text{Estimated delay} = (b-1)^* T_{LOW\ POWER} > d$$

If the above criterion is not satisfied, the connection switches to ACTIVE mode.

Figure 3:
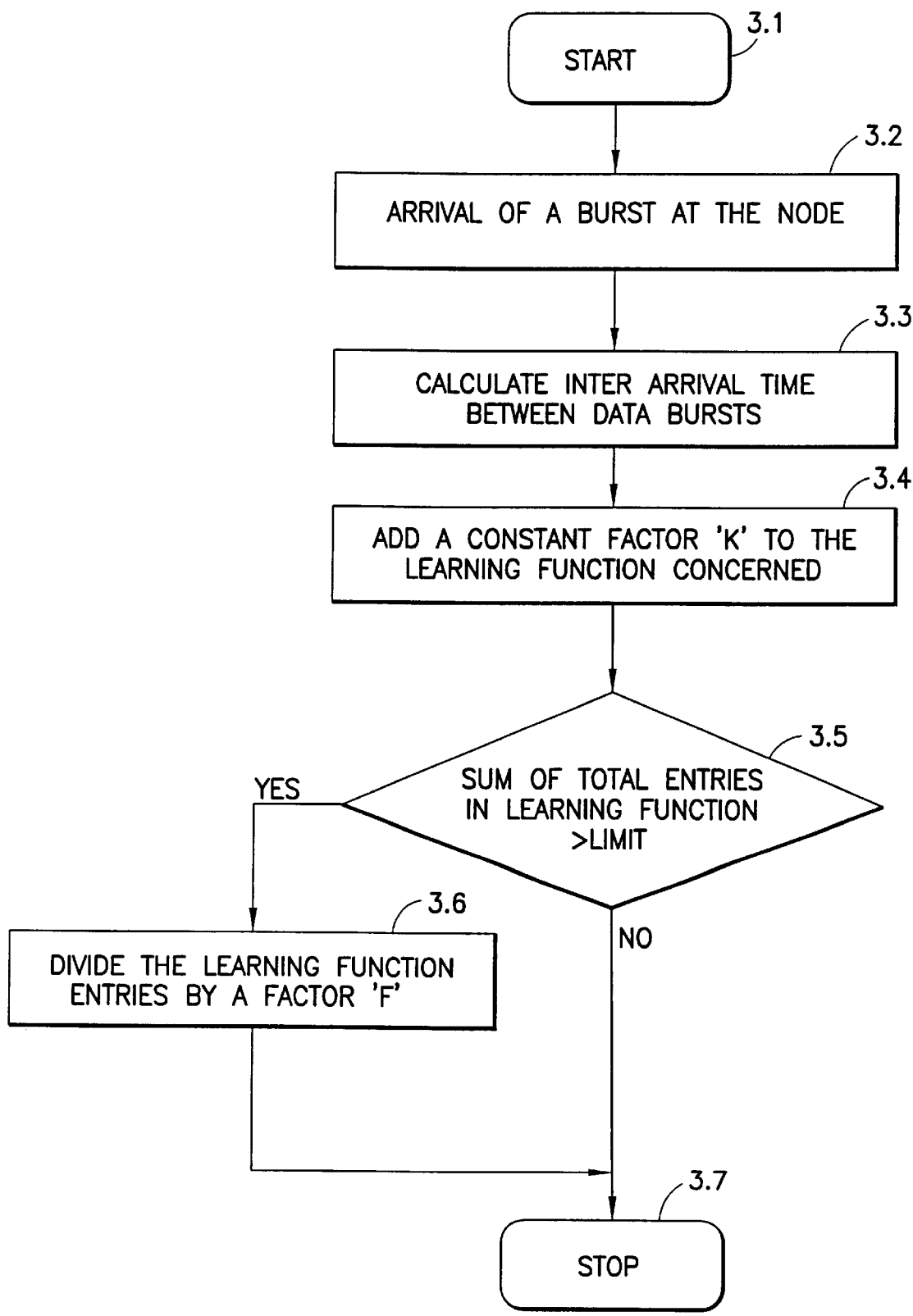
FIG. 3 shows the flowchart for the activities performed on the arrival of data at a burst node.

FIG. 3 shows flowchart for the activities performed on arrival of data burst at a slave. When a new burst arrives at the queue of a particular stream (3.2) the system calculates the inter-arrival time between data bursts (3.3) and adds a constant factor K to the learning function ($H^K$) (3.4). If the sum of total entries in learning function is greater than LIMIT (3.5), then the! learning function is divided by a constant factor F (3.6), otherwise the process steps (3.7).

This process is represented in software terms as a method as defined hereunder: The following are the parameters for the system.

Environment Parameters

D: The distribution of the data-traffic.

$T_{LOW\ POWER}$: The polling interval when a slave is in LOW POWER mode.

$P_{LOW\ POWER}$: The energy per slot required by a slave in LOW POWER mode.

$P_{TRANSMIT}$: The energy per slot required by a slave to transmit.

$P_{RECEIVE}$: The energy per slot required by a slave to receive.

DEADLINE: The deadline of the service of a slave in the ACTIVE state.

Method Parameters

M: The maximum value of the time-interval observed in the learning function.

H: The learning function which is maintained for both Master to Slave and reverse flow. Thus there are two learning functions per connection.

V: The overhead of transferring a slave to LOW POWER mode and back to ACTIVE mode.

M: The number of entries at any time in the learning function.

$P_{AS}$: The probability that a packet does not satisfy its QoS parameters of delay. This is used as a threshold probability in calculating the feasibility of putting a slave into LOW POWER mode.

$P_B$: The probability that a packet does not satisfy its QoS parameters of delay. This is used as a threshold probability in calculating the polling interval of a device in LOW POWER mode.

LIMIT: The limit on the value of any H for the traffic connection.

Method Variables:

$T_{AS}$: The time-interval between two bursts which require the channel in ACTIVE state. This value is used to determine the feasibility of going into LOW POWER mode.

$T_P$: The time-interval between two polling intervals when a slave is in LOW POWER mode. This value is the same as $T_{LOW\ POWER}$ for the next polling only.

The events that trigger actions as regard to scheduling at the MAC of the Master in the APPI-FR method are:

1) Arrival of Data at a Device

Whenever a new burst arrives at the queue of a particular stream for scheduling at a device the inter-arrival time between the last burst and the present burst is noted in a learning function $H^k$ where 'k' indicates the slave index. Thus if the inter-arrival time between two data-bursts is 'i' then $H^k(i)$ is incremented by a constant factor K. Thus the steps are: (see FIG. 3).

a) Calculate inter-arrival time 'i' between the first packets of the data-bursts.

b) Add a constant factor K to $H^k(i)$.

c) If $\Sigma_{j=0}^{m-1} H^k(j) > $ LIMIT, where LIMIT is a constant factor then divide the learning function by a constant factor F (>1) such that the weight of the old data is exponentially reduced with time.

Figure 4:
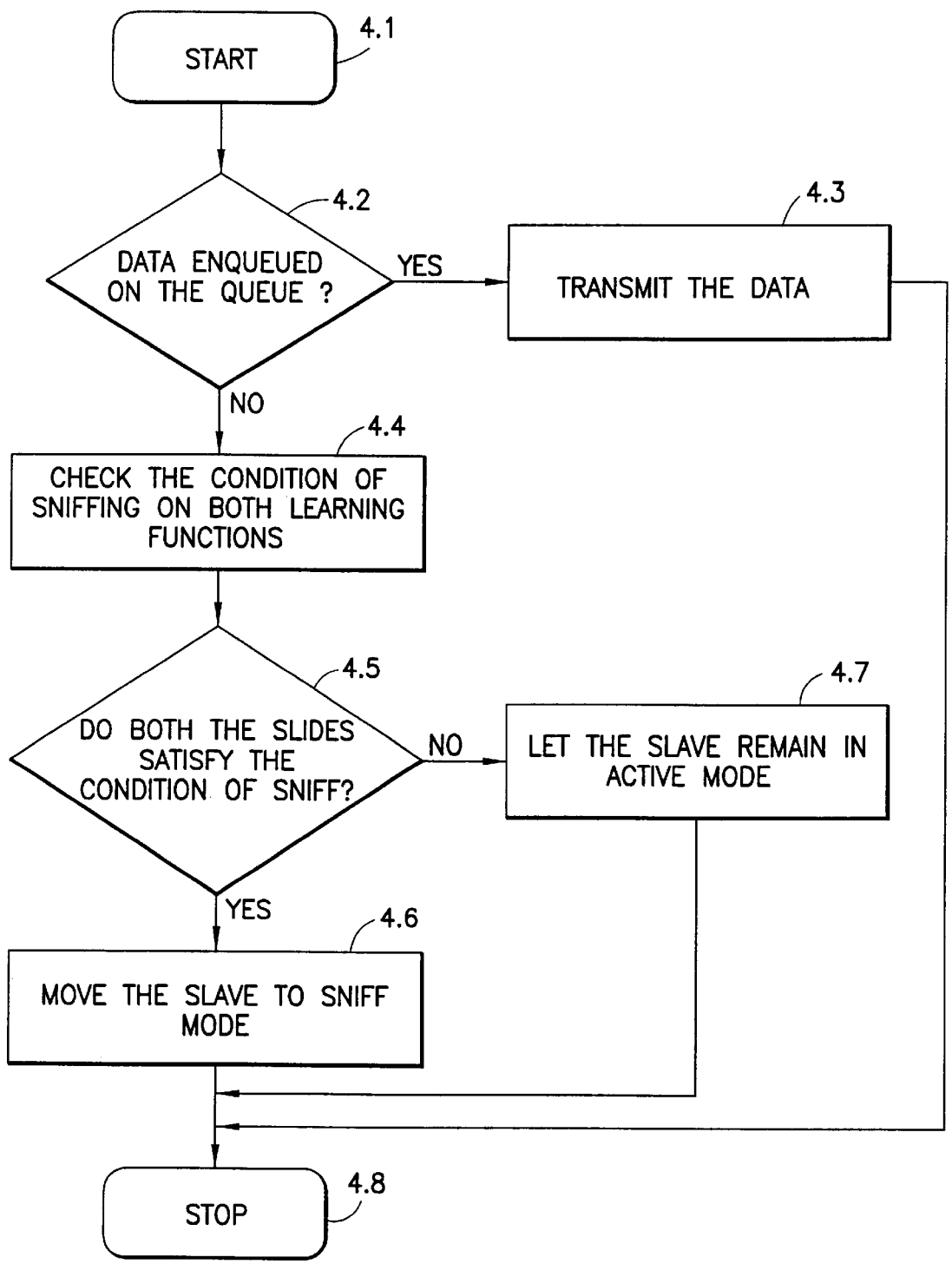
FIG. 4 shows a flowchart for the activity at a slave in ACTIVE state.

FIG. 4 shows a flowchart for the activity at a slave in ACTIVE state. The slave checks for data in an internal queue (4.2). If data is present in the queue it is transmitted (4.3) otherwise the slave checks for a condition of LOW POWER operation on learning function of both the master and the slave (4.4). If both conditions of LOW POWER operation is satisfied (4.5) then the slave is switched to LOW POWER mode (4.6), otherwise the slave remains in ACTIVE mode (4.7) and the process is stopped (4.8).

If the connection has data to transmit, then the connection is serviced. However, if the connection has no data in the queue, then if the Condition of Low Power mode is satisfied by both the Master and Slave learning functions $H_M$ and $H_S$, then the connection is put into LOW POWER mode.

Thus the steps are: (see FIG. 4)

1. If data is queued. Transmit.
2. If no data to transmit: Check the Condition of Low Power mode on $H_M$ and $H_S$.
3. If both $H_M$ and $H_S$ satisfy the Condition of Low Power mode: Go to Low Power mode.
4. Else: Remain in ACTIVE mode.
5. If a connection goes to LOW POWER mode: Calculate the polling interval at both the master and slave while going to LOW POWER mode.
6. The polling interval is the minimum of the two calculated.

Figure 5:
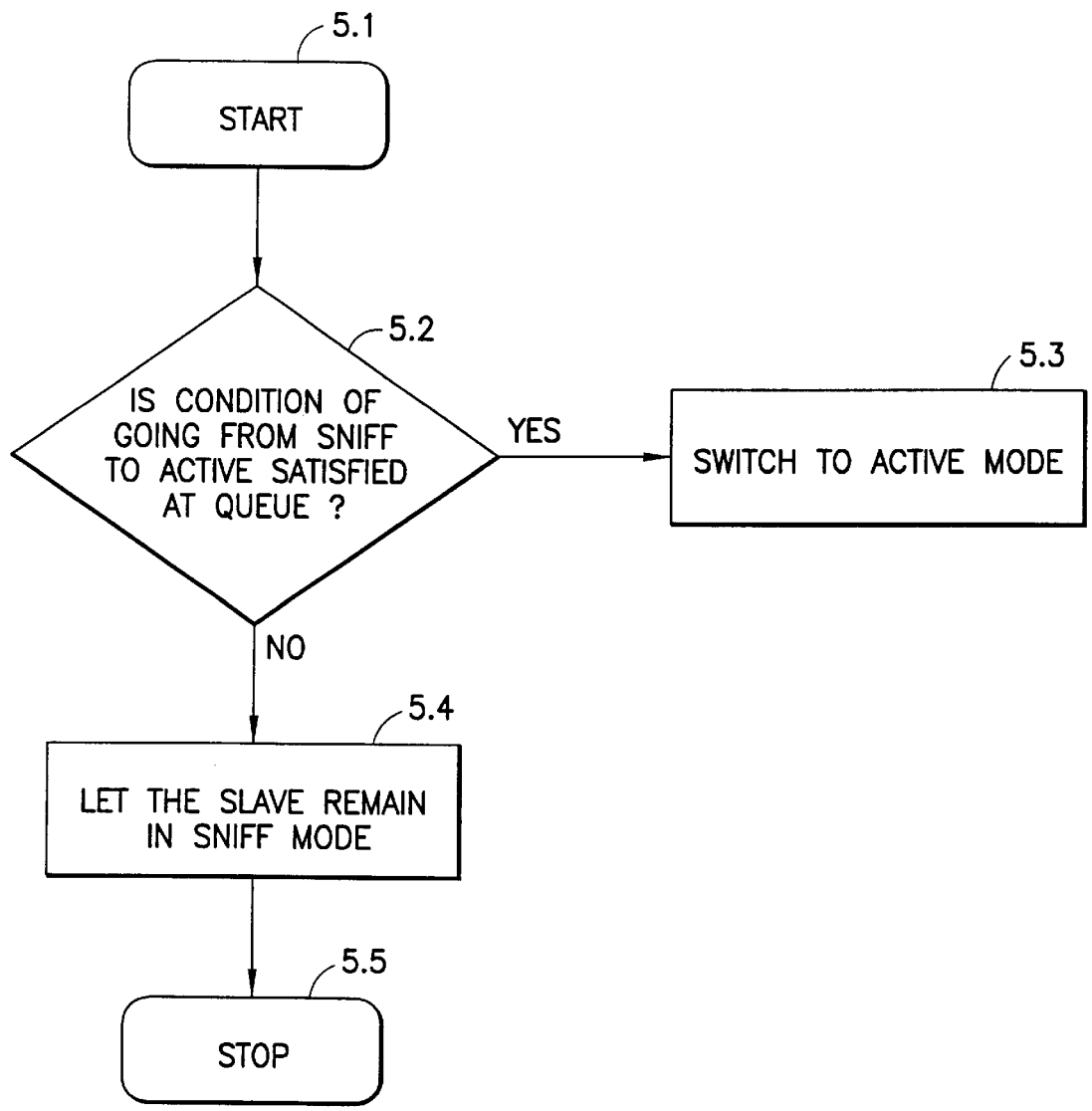
FIG. 5 shows a flowchart for the activity at a slave in LOW POWER state.

FIG. 5 shows a flowchart for the activity at a slave in LOW POWER state. When a connection with slave in LOW POWER state is scheduled, the master and the slave checks the criteria of switching from LOW POWER to ACTIVE (5.2). If it is satisfied on either queues Switch to ACTIVE state (5.3). Otherwise remain in LOW POWER mode and service the slave. (5.4) and finally the process stops (5.5).

When a connection with a slave in LOW POWER state is scheduled, the Master and the slave check the criterion of switching from LOW POWER to ACTIVE.

If it is satisfied, the connection is switched to ACTIVE state. Thus the steps are: (see FIG. 5)

1. Check the Condition of switching from LOW POWER to ACTIVE on both the queues at the Master and the Slave.
2. If it is satisfied on either queues Switch to ACTIVE state.
3. Otherwise Remain in LOW POWER mode and service the slave.

Whenever the learning function is updated at the arrival of a data-burst at the Master side or the Slave side, it is checked that the expected probability of data arrival at any polling interval (e.g., 'j') does not exceed a prefixed threshold 'Pr' which is a function of the degree 'N' of the learning function.

$$H(j)/(_{i=0}\Sigma^N H(i)) \geq Pr$$

Condition of Equalization

If such be the case the $j^{th}$ inter-arrival range is bifurcated into two ranges. To keep the degree of the learning function constant, two adjacent inter-arrival ranges with the minimum sum of expected probability are joined together. This achieves higher resolution at the inter-arrival range where the data rate is higher while keeping the number of buckets to a small and constant number.

1. Check the Condition of Equalization on H.
2. If it is satisfied on H for inter-arrival range 'j' Bifurcate that inter-arrival range.
3. If a inter-arrival range is bifurcated join two adjacent inter-arrival ranges which sum to the minimum value in the histogram H.

$$\min[H(i)+H(i+1)] \text{ for all } i \in N$$

Figure 6:
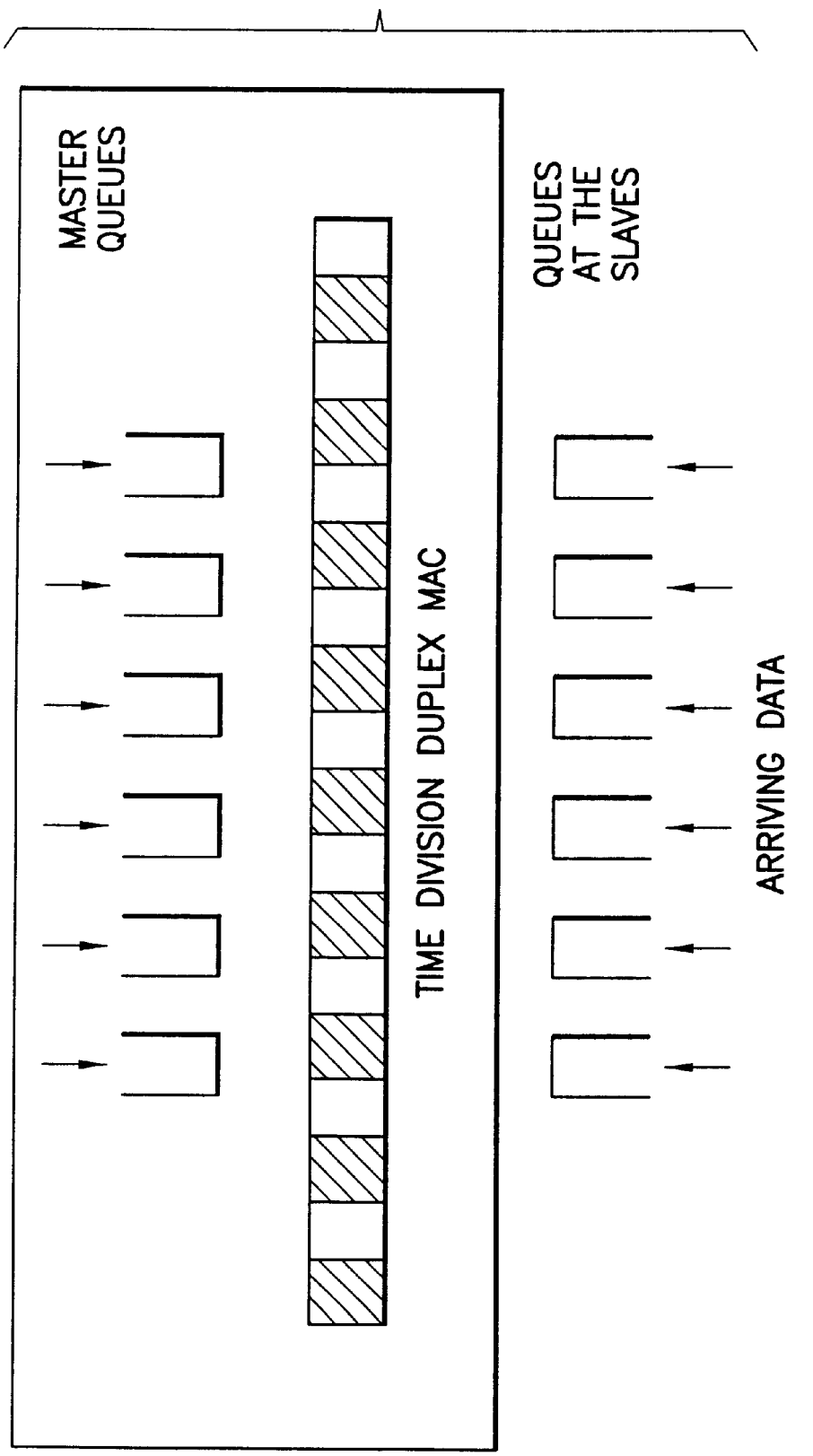
FIG. 6 shows a TDD MAC in a Bluetooth Piconet with queues at the Master and the Slaves.

FIG. 6 shows the TDD MAC in a Bluetooth Piconet with queues at the Master and the Slaves used for discrete event simulation. The traffic between the master and slaves used to illustrate the optimizations in power and end-to-end delay achieved by APPI is as follows:

1. TCP Traffic trace from ee.lbl.gov
2. TCP Transport Layer with HTTP Application Layer (from traffic simulations)
3. TCP Transport Layer with FTP Application Layer (from traffic simulations)
4. CBR traffic.
5. TCP dump collected from a Realplayer playing audio from a 16 Kbps link.

The following base policies are used for comparison with APPI-AR:

1. Always Active Mode (AAM): In this policy, all the slaves are kept in ACTIVE mode at all times, thus the LOW POWER mode is not used.
2. Fixed Polling Interval (FPI): In this policy, we move a connection to SNIFF mode whenever there is no data at both the master's and the slave's queues with a fixed polling interval, POLLINT.
3. Mean Variance Policy (MEAN): In this policy, we move a connection to SNIFF mode whenever there is no data at both the master's and the slave's queues with the polling interval based on the mean and variance of inter-arrival times of previous bursts.

4. Off-line Optimum Policy: In this policy, the master does scheduling and handles the switching among power modes according to the conditions described in APPI based on the actual arrival of data, thus reducing the power consumption of the devices and end-to-end packet delays to an optimum level.

The other details are:
 1. Maximum number of slaves in the piconet: Seven
 2. Polling interval in SNIFF state: Adaptive between 100–500 slots.
 3. Length of each TDD slot: 625 μsec
 DEADLINE: 40 slots
 POLLINT: 250 slots
 $P_{SNIFF}$: 0.5 unit
 $P_{RECEIVE}$: 0.5 unit
 $P_{TRANSMIT}$: 1 unit
 O: $2*P_{TRANSMIT}+2*P_{RECEIVE}=3$ units
 $P_{AS}$: 0.3
 $P_B$: 0.3

The simulations cover different optimization policies namely:
 1. Always Active Mode (AAM)
 2. Fixed polling Interval (FPI)
 3. Mean Variance policy (MEAN)
 4. The Adaptive Probability based Polling Interval with Adaptive Resolution (APPI-AR).

The results of all the policies are shown normalized with respect to the off-line policy.

In APPI-AR, the learning function is implemented by a histogram with the number of columns representing the degree of the learning function and the boundaries of each column representing the inter-arrival ranges.

The simulations cover 110,000 Bluetooth slots and the results cover 50,000 slots onwards, thus neglecting the time taken by the learning function to adapt to the nature of the traffic.

Figure 7:
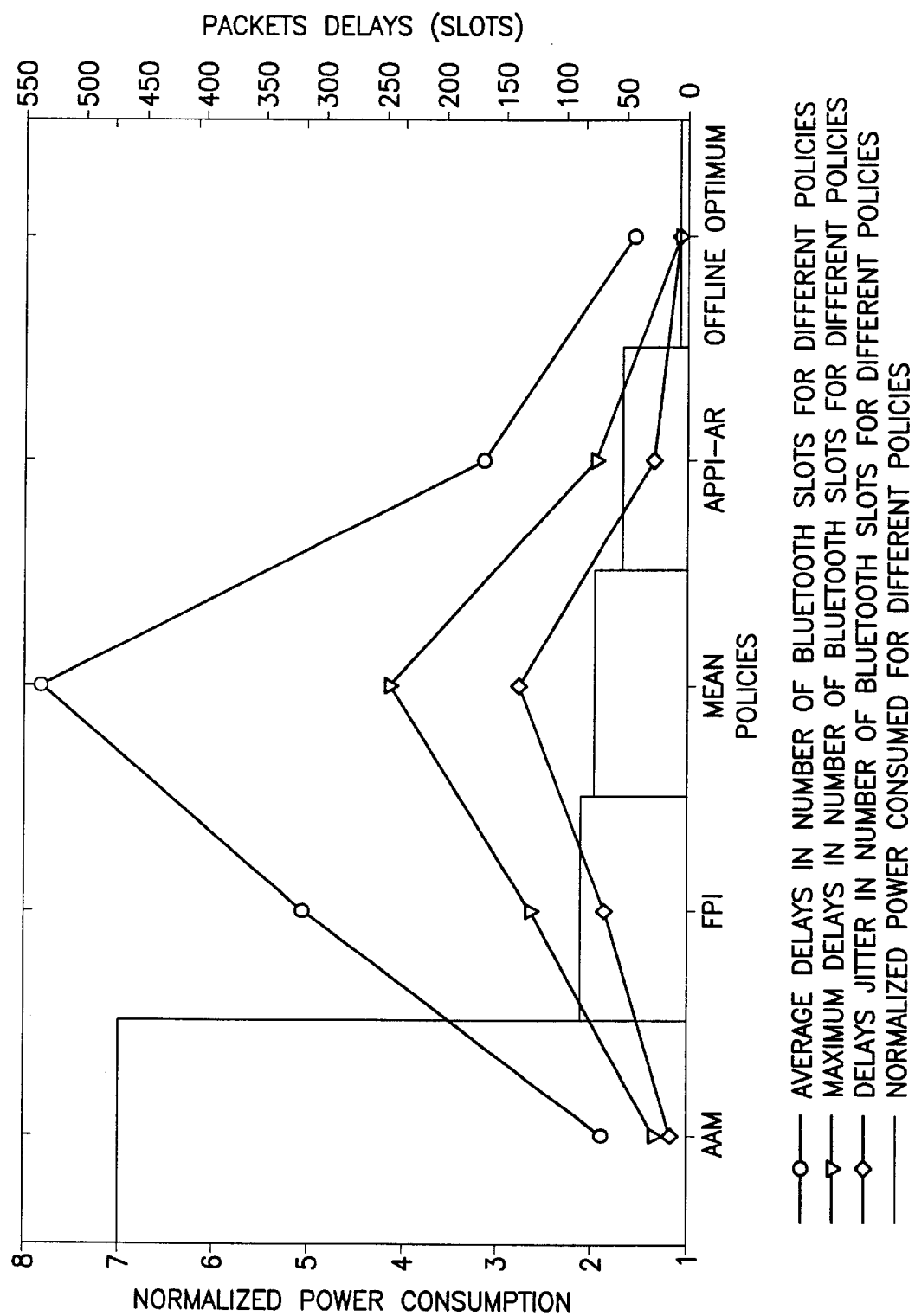
FIG. 7 shows a graph of the power and end-to-end delay obtained for a simulated TCP trace for AAM, FPI, MEAN, APPI-AR and offline-optimum policies.

FIG. 7 shows a graph of the power and end-to-end delay obtained for a simulated TCP-trace for AAM, FPI, MEAN, APPI-AR and the Off-line Optimum policies. FPI and MEAN save considerable amount of power but the delays increase to a very large value. APPI-AR adapts to the traffic distribution and reduces the power to a value very near to that of Off-line Optimum policy, while decreasing the delays as compared to FPI and MEAN. APPI saves 85% of the power consumed in AAM, 20% of the power consumed in FPI and MEAN, and the delays are very less as compared to FPI and MEAN.

Figure 8:
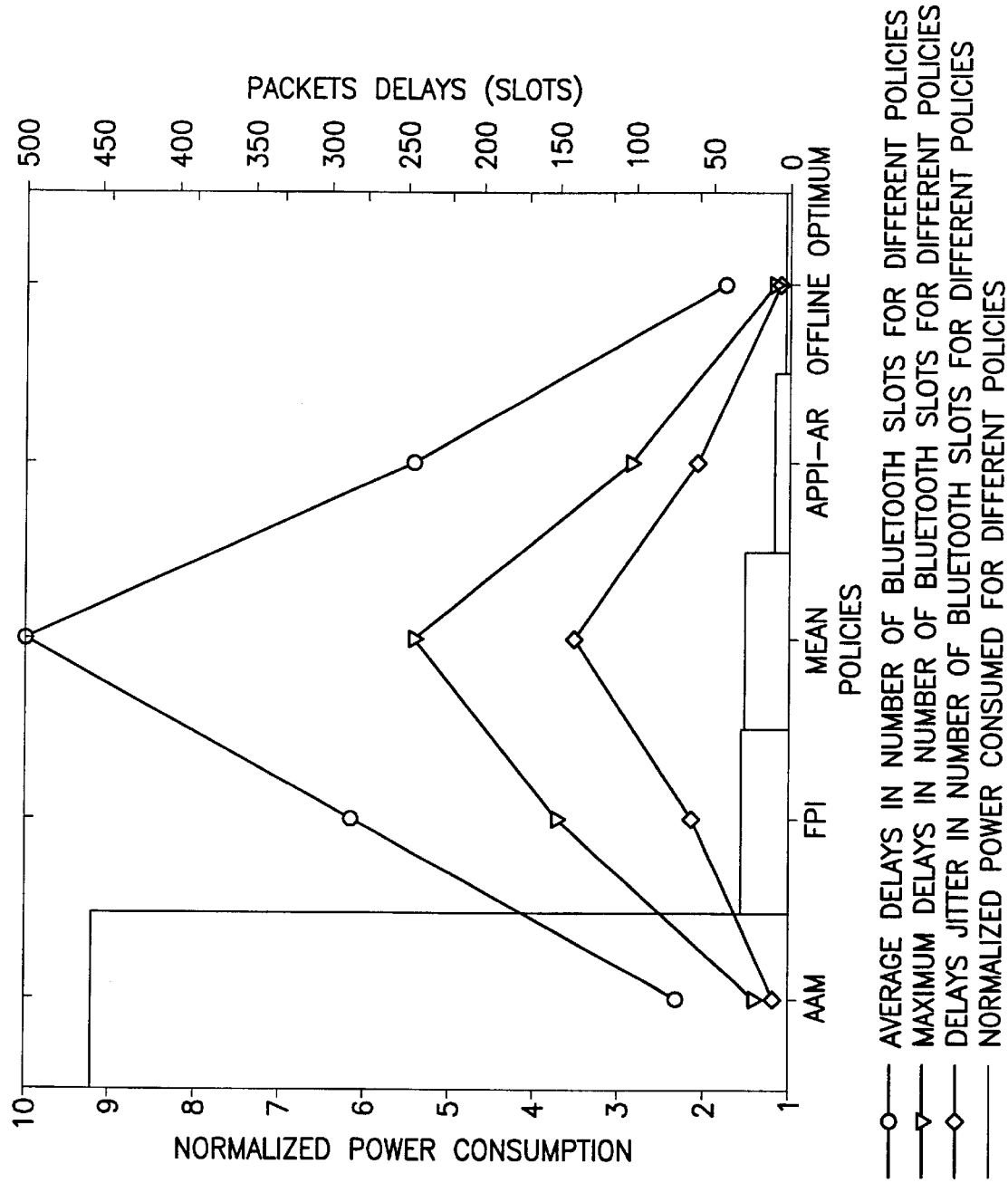
FIG. 8 shows a graph of the power and end-to-end delay obtained for a simulated FTP Application over TCP for AAM, FPI, MEAN, APPI-AR and offline-optimum policies.

FIG. 8 shows a graph of the power and end-to-end delay obtained for a simulated FTP application over TCP layer for AAM, FPI, MEAN, APPI and the Off-line Optimum policies. FPI and MEAN save considerable amount of power but the delays increase to a very large value. APPI-AR adapts to the traffic distribution and reduces the power to a very low value, while decreasing the delays as compared to FPI. APPI saves 79% of the power consumed in AAM, 20% of the power consumed in FPI, 15% of the power consumed in MEAN and the delays are reduced very much as compared to FPI and MEAN.

Figure 9:
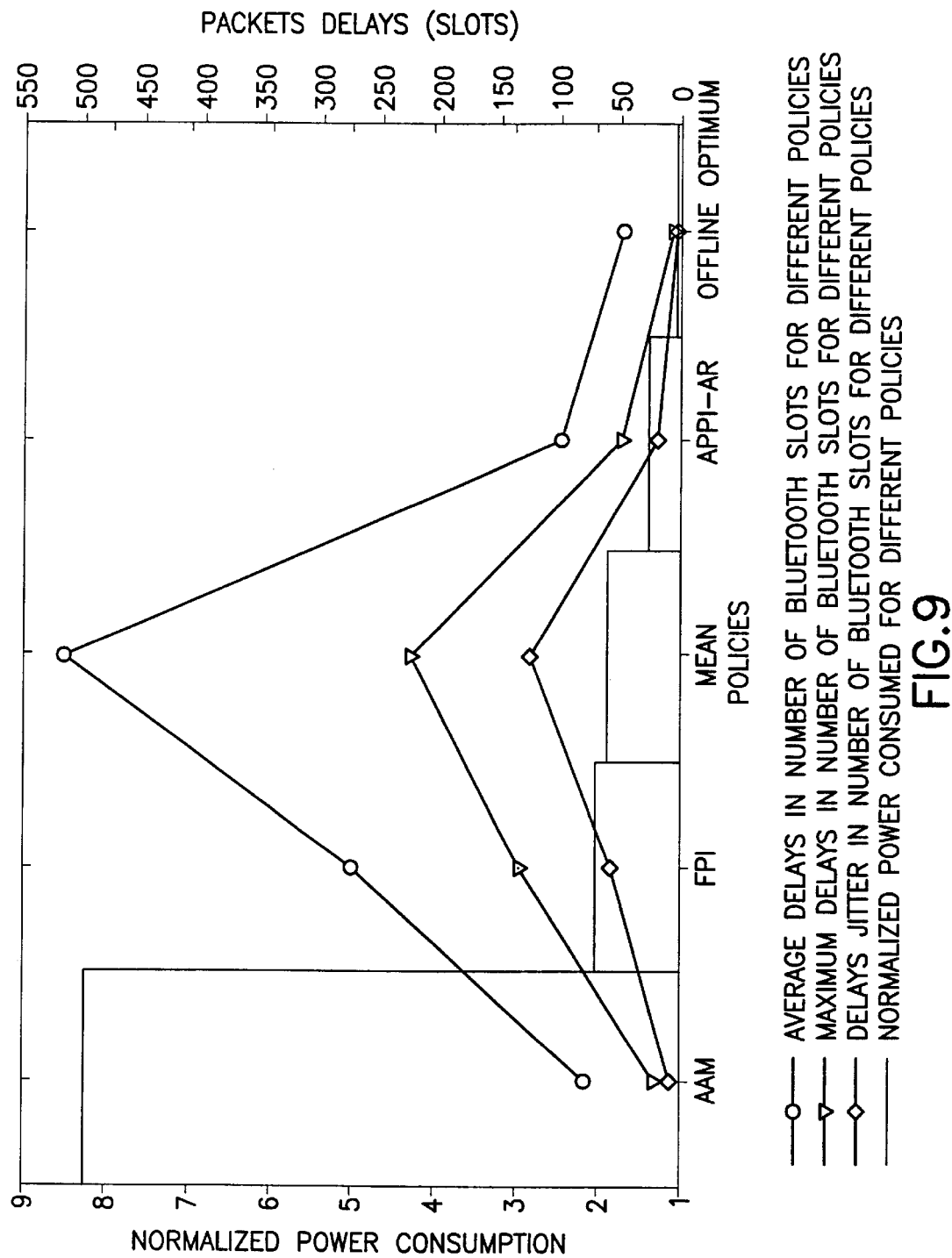
FIG. 9 shows a graph of the power and end-to-end delay obtained for a simulated HTTP traffic over TCP application layer collected for AAM, FPI, MEAN, APPI-AR and offline-optimum policies.

FIG. 9 shows a graph of the power and end-to-end delay obtained for a simulated HTTP traffic over TCP application layer for AAM, FPI, MEAN, APPI-AR and the Off-line Optimum policies. FPI saves considerable amount of power but the delays increase to a very large value. APPI-AR adapts to the traffic distribution and reduces the power to a very low value, while decreasing the delays as compared to FPI and MEAN. APPI saves 84% of the power consumed in AAM, 40% of the power consumed in FPI and MEAN, and the delays are very less as compared to FPI and MEAN.

Figure 10:
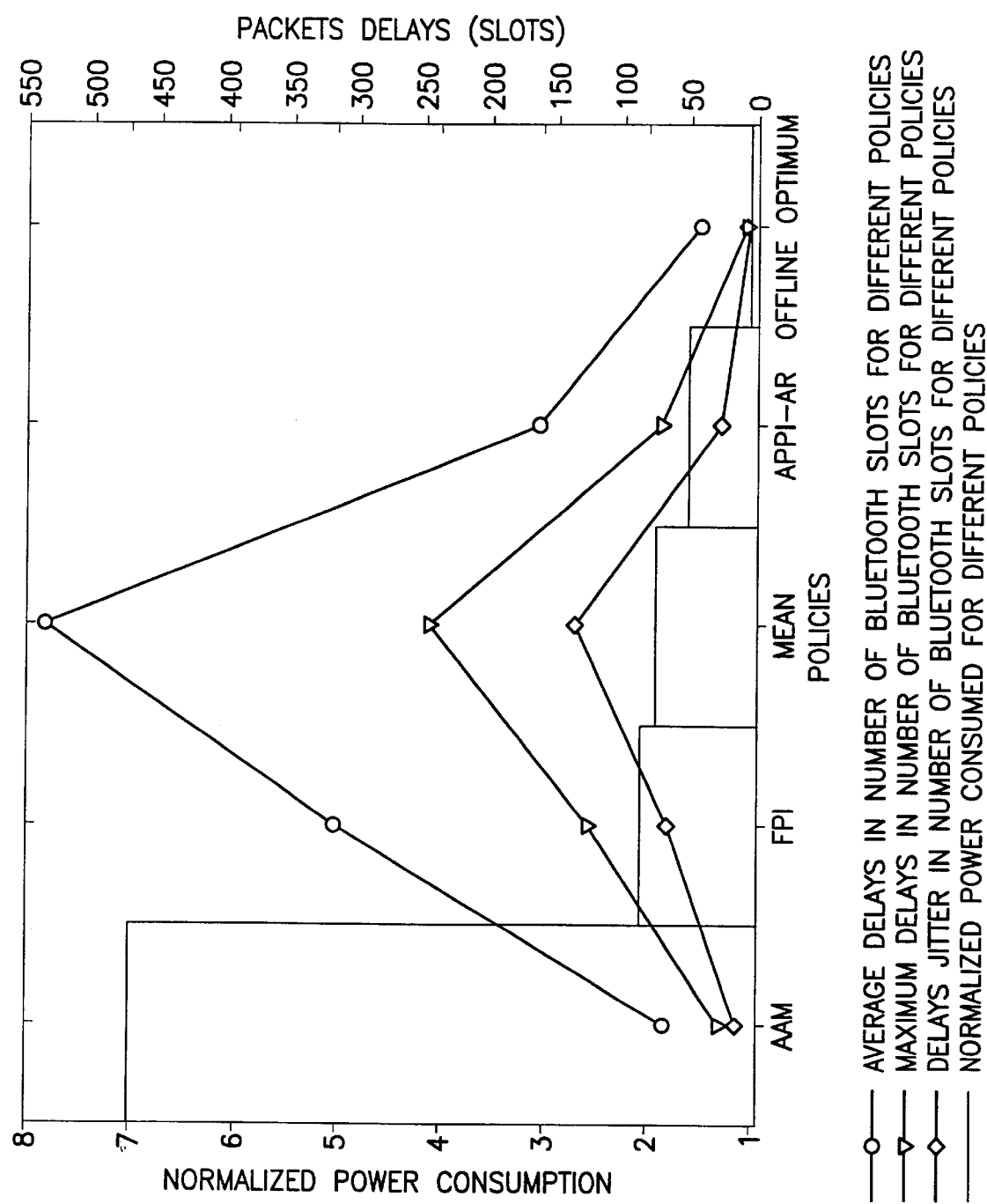
FIG. 10 shows a graph of the power and end-to-end delay for CBR traffic for AAM, FPI, MEAN, APPI-AR and offline-optimum policies.

FIG. 10 shows a graph for the power and end-to-end delay for CBR traffic for AAM, FPI, MEAN, APPI-AR and the Off-line Optimum policies. FPI and MEAN do not save too much power in the case of CBR traffic as they have to switch the power modes too often if the CBR rate does not match the polling interval used by FPI and MEAN. The delays also increase to a very large value. APPI-AR adapts to the traffic distribution and reduces the power to a value equal to that of Off-line Optimum policy as it adapts to the CBR rate and takes it as the polling interval. The delays are also reduced as compared to FPI and MEAN. APPI-AR saves 88% of the power consumed in AAM, 70% of the power consumed in FPI, 66% of the power consumed in MEAN and the delays are very less as compared to FPI and MEAN.

Figure 11:
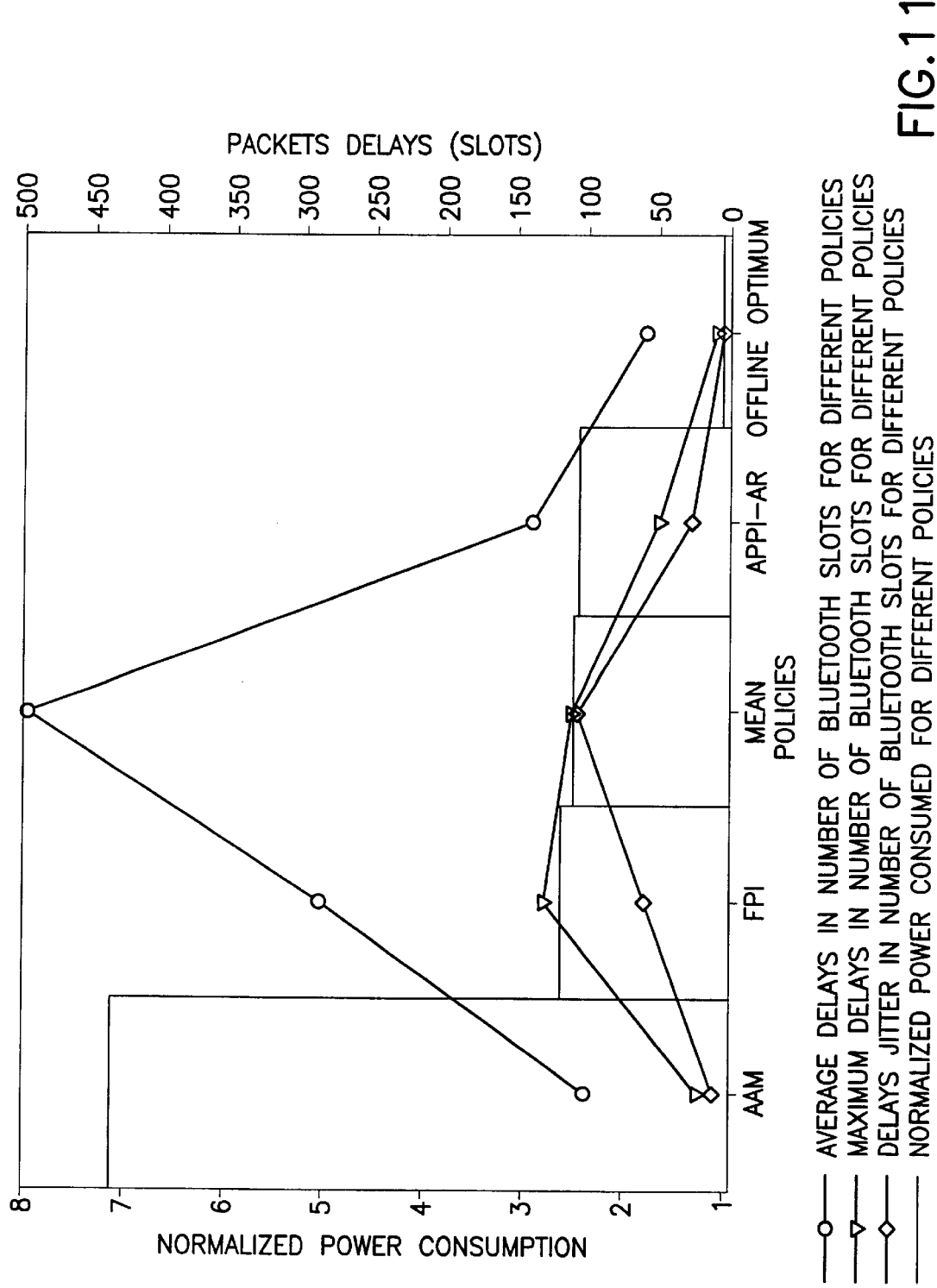
FIG. 11 shows a graph of the power and end-to-end delay for for AAM, FPI, MEAN, APPI-AR and offline-optimum policies.

FIG. 11 shows a graph of the power and end-to-end delays obtained for a TCP dump of 16 kbps Realplay audio traffic for AAM, FPI, MEAN, APPI-AR and the Off-line Optimum policies. FPI and MEAN save considerable amount of power but the packet delays increase to a very large value. APPI-AR adapts to the traffic distribution and reduces the power to a very low value, while decreasing the delays as compared to FPI and MEAN. APPI-AR saves 65% of the power consumed in AAM and the delays are much less as compared to FPI and MEAN. The maximum delay is of most consideration in realplay audio which is very high for FPI and MEAN while for APPI-AR, it is comparable to AAM.

Figure 12:
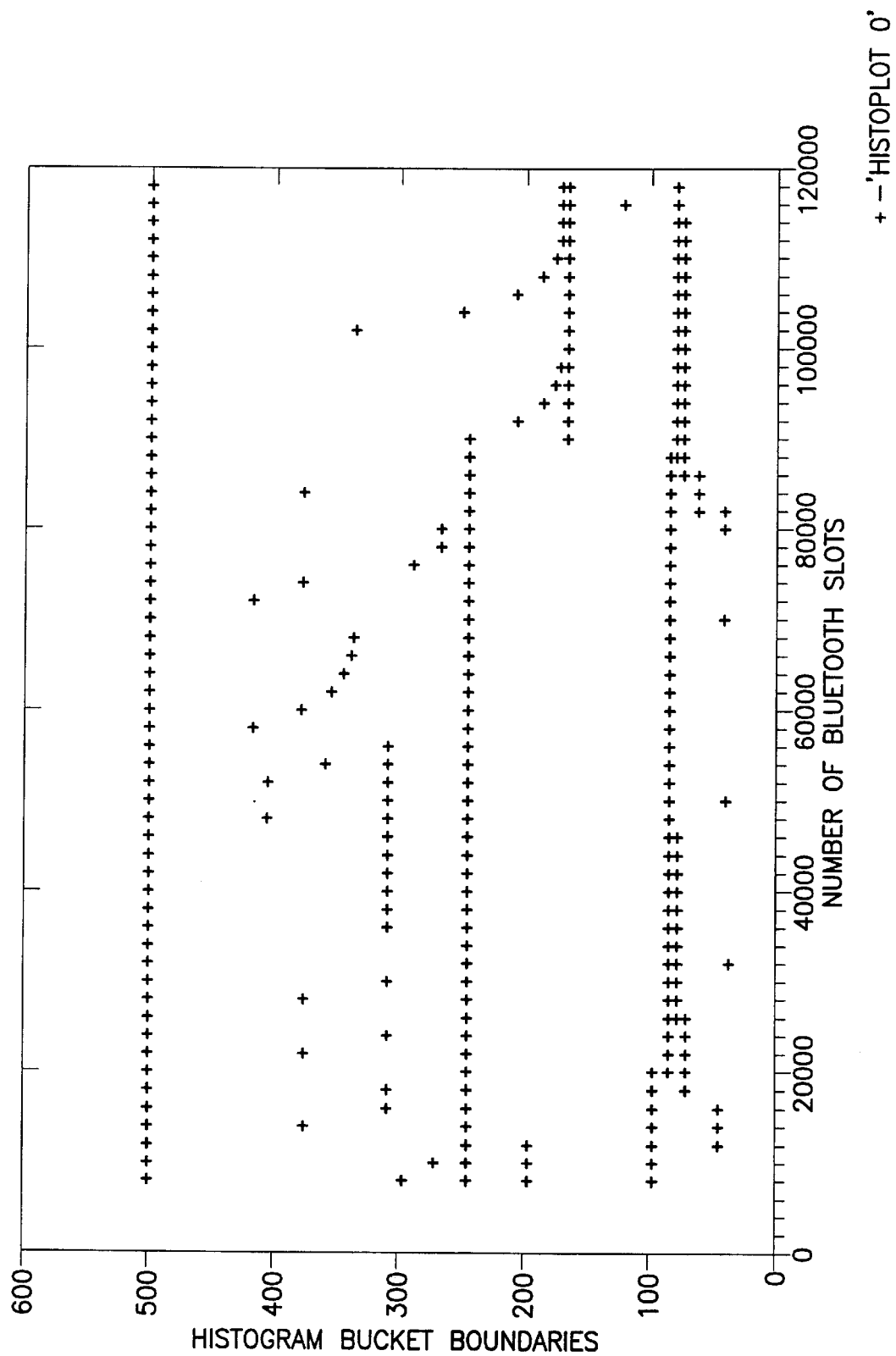
FIG. 12 shows the adaptation of histogram boundaries to the changing inter arrival times of the traffic for FTP over TCP.

FIG. 12 shows the adaptation of histogram boundaries to the changing inter-arrival times of the traffic. The range of inter-arrival times where more data packets arrive have finer resolution while other ranges have a coarser resolution. As can be seen in above graph, the boundaries have converged in areas where more packets have arrived, thus making the calculation of polling interval more accurate.

Figure 13:
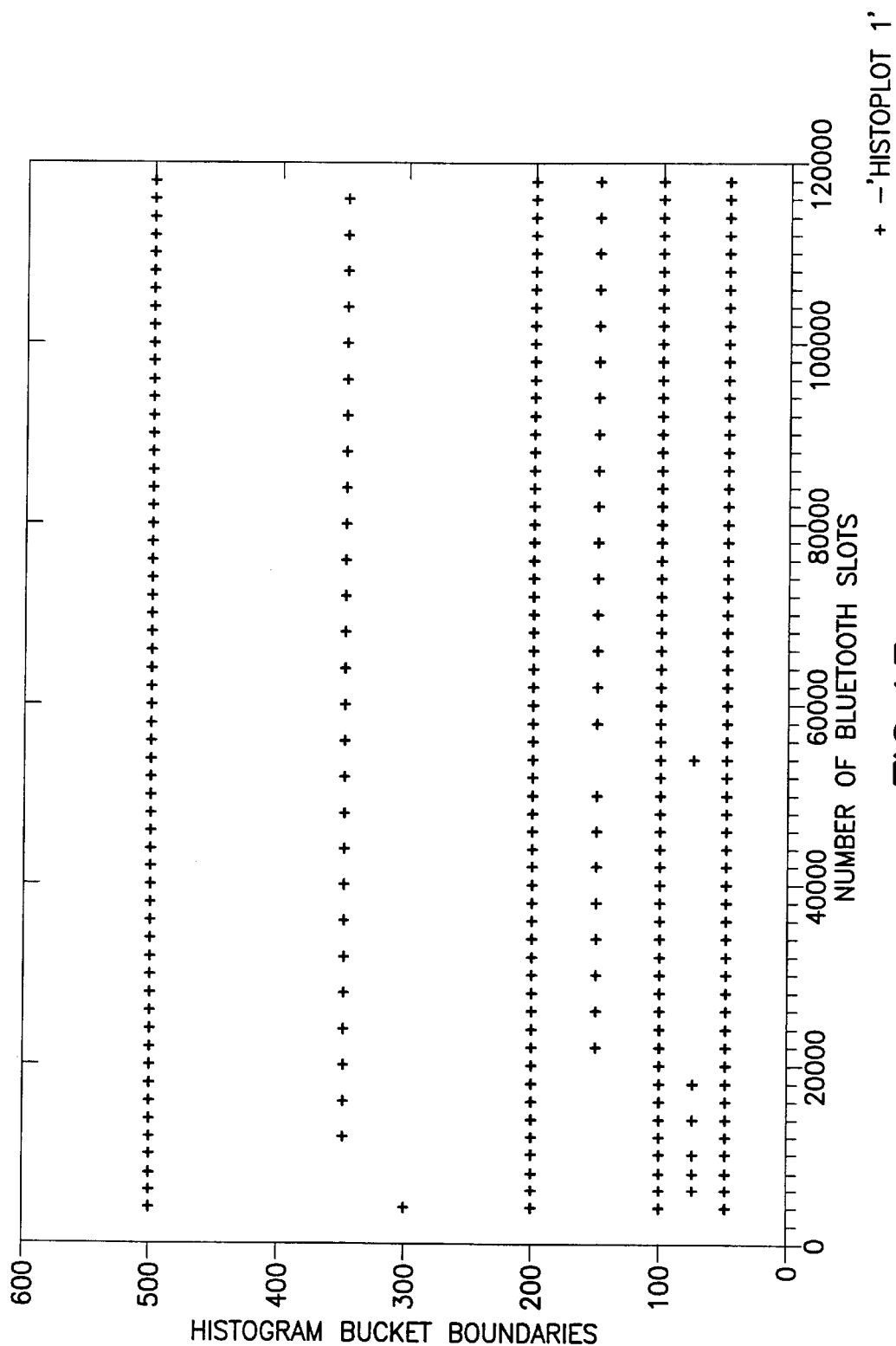
FIG. 13 shows the adaptation of histogram boundaries to the changing inter arrival times of the traffic for FTP over TCP.

FIG. 13 shows the adaptation of histogram boundaries to the changing inter-arrival times of the traffic. The range of inter-arrival times where more data packets arrive have finer resolution while other ranges have a coarser resolution. As can be seen in above graph, the boundaries have converged in areas where more packets have arrived, thus making the calculation of polling interval more accurate. As HTTP is non-consistent, the histogram boundaries at 150 slots and 350 slots seem to be flipping in consecutive equalizations due to non-consistency in the HTTP traffic.

Figure 14:
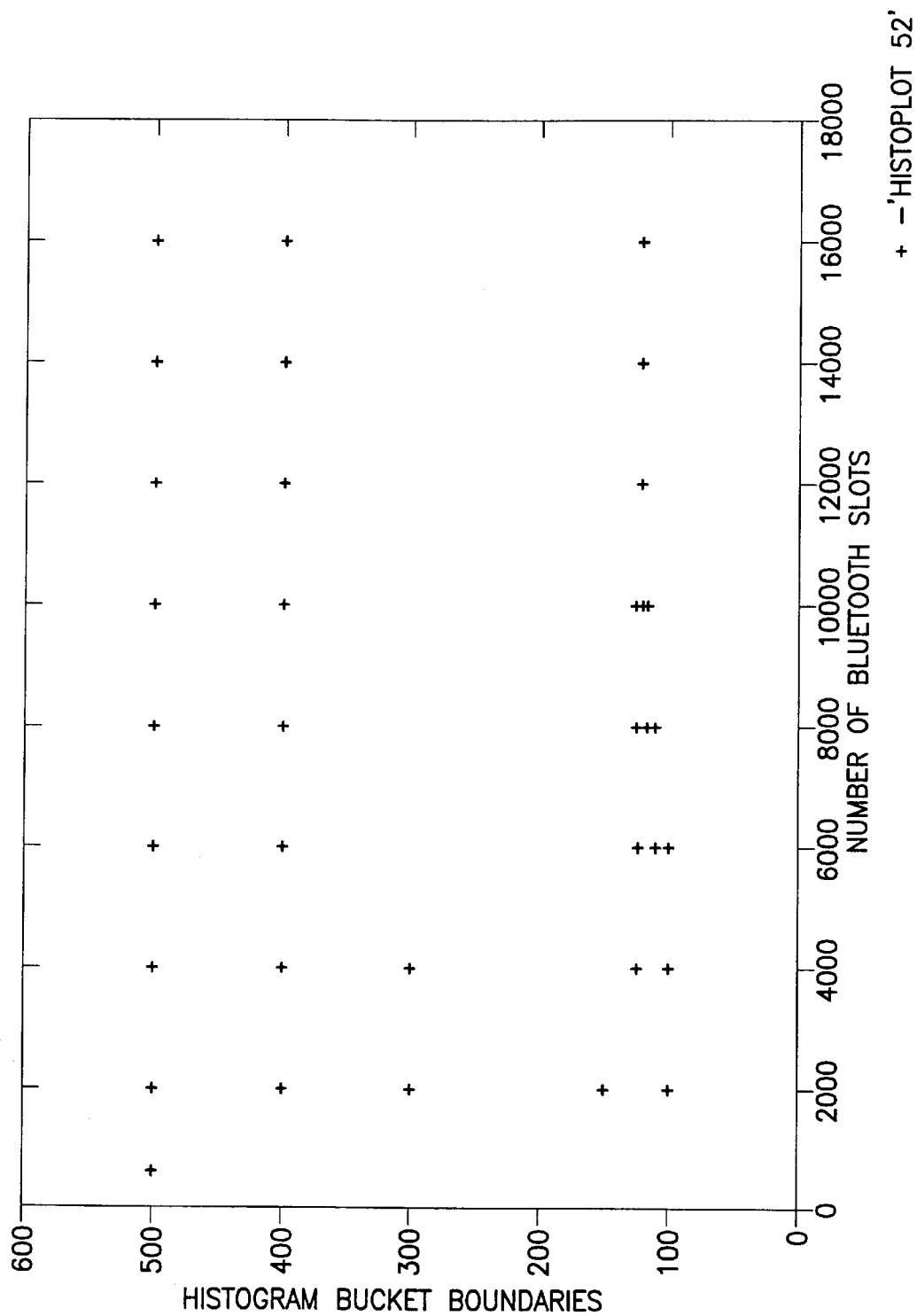
FIG. 14 shows the adaptation of histogram boundaries to the changing inter arrival times of the traffic for CBR.

FIG. 14 shows the adaptation of histogram boundaries to the changing inter-arrival times of the traffic. As the inter-arrival, time of consecutive bursts is constant here, so three consecutive boundaries can be seen to converge to that inter-arrival rate, resulting in exact calculation of polling interval. This results the matching of APPI with Off-line Optimum Policy in terms of power consumption (see FIG. 11).

Figure 15:
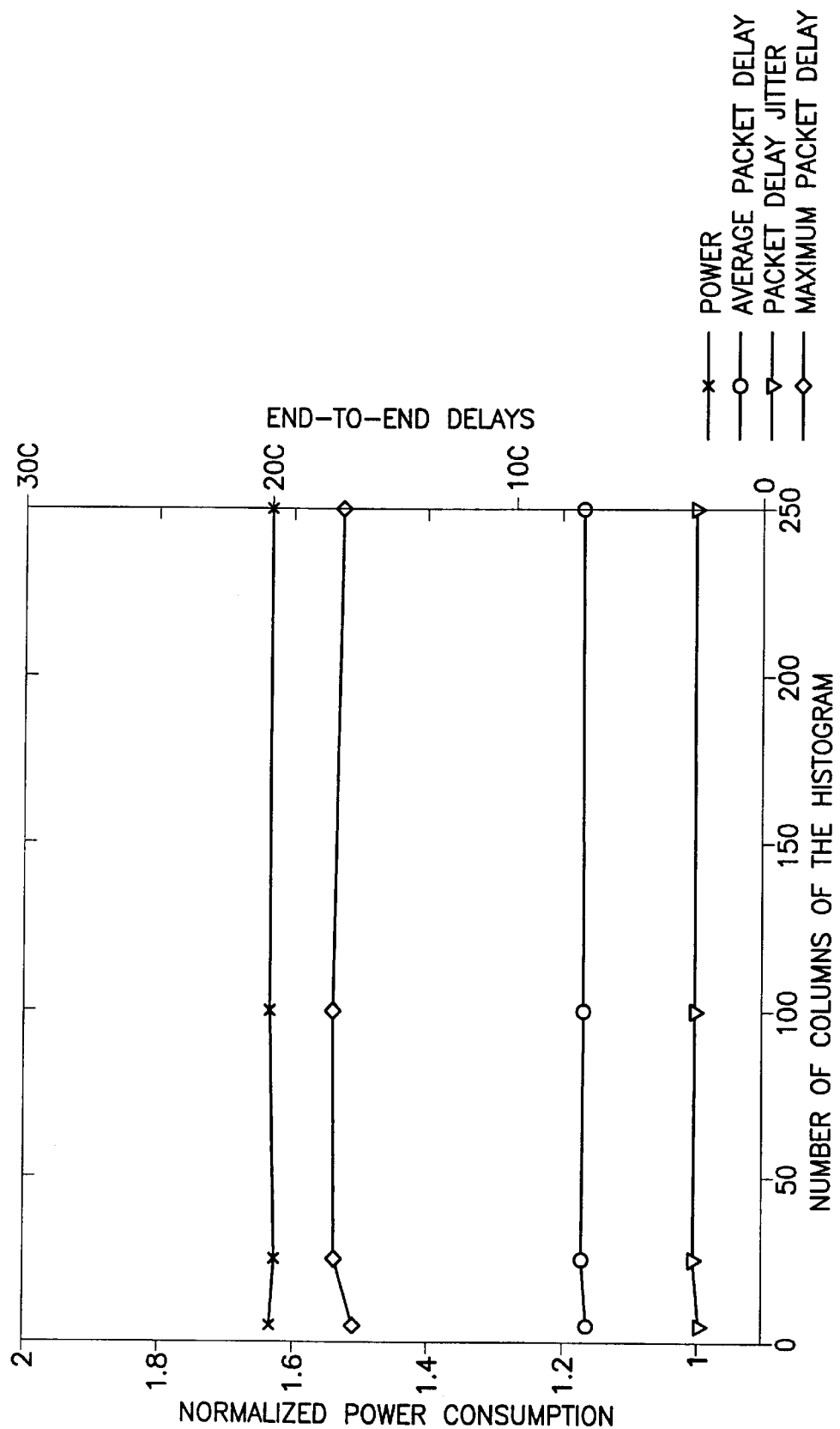
FIG. 15 shows the performance of APPI-AR for different number of columns of the histogram.

FIG. 15 shows the performance of APPI-AR with varying number of histogram columns for $P_B=0.3$. It can be seen that the performance is similar for all the cases. Thus having the number of columns of histogram as 5 gives good results with less computational overheads. This also shows that APPI-AR adapts to the traffic equally well even if the number of buckets is less, which is an advantage of APPI-AR over other policies considered in this work for comparison.

Figure 16:
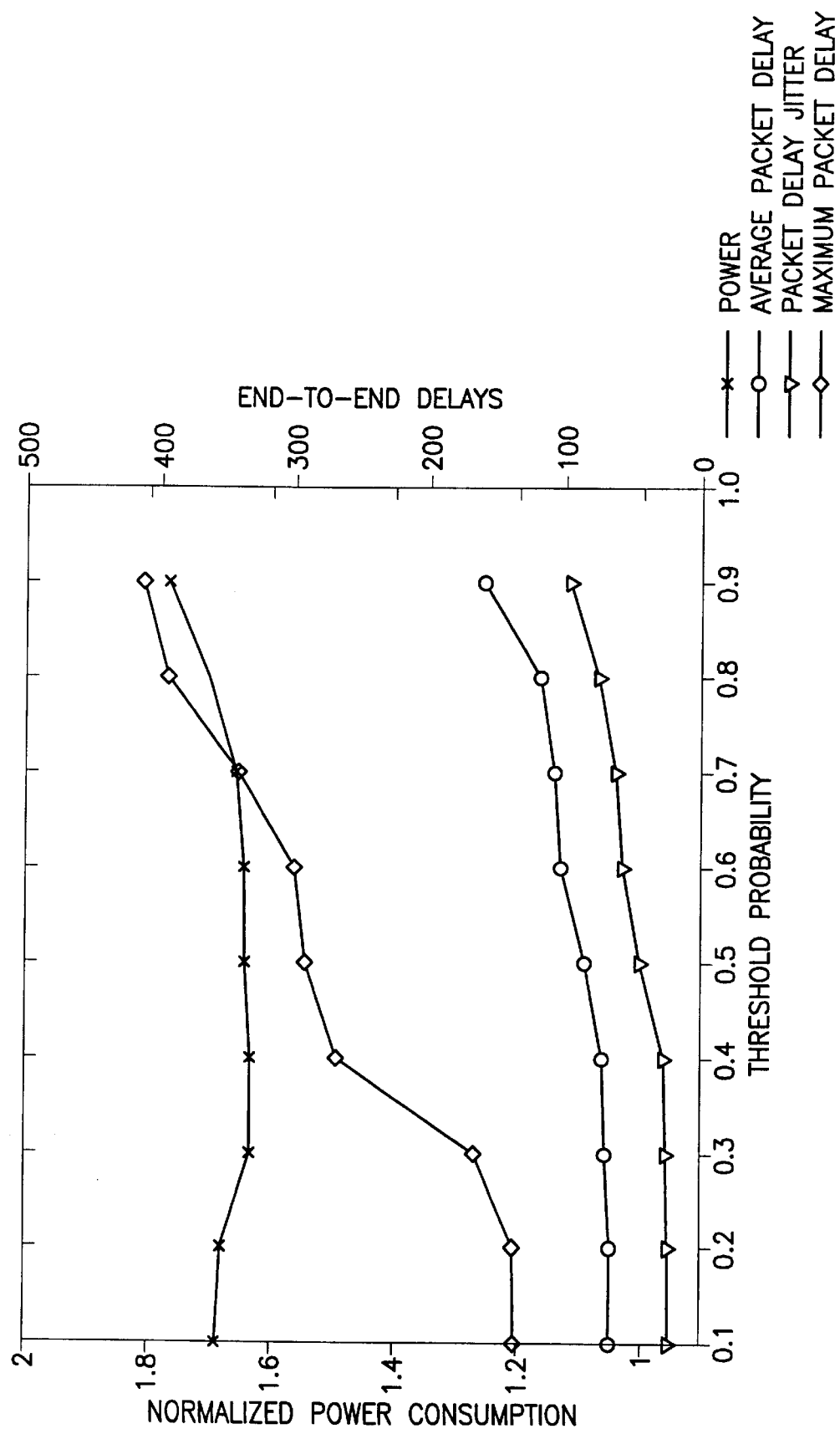
FIG. 16 shows the graph of performance of APPI-AR for varying Threshold Probability ($P_B$).

FIG. 16 shows a graph of the performance of APPI-AR with varying $P_B$ for fixed number of histogram columns (=5). It shows the performance of AAPI-AR for varying $P_B$. As can be seen, the value of $P_B$ can be taken between 0.1–0.3 for good power savings and low delays. However $P_B$ can be fixed depending upon the QoS parameters required by the connection.

What is claimed is:

1. A system for managing power consumption in a master driven time division duplex wireless network comprising means for optimizing power consumption while maintaining quality of service requirements for end-to-end packet delay, by adjusting a polling interval for each slave in low power mode based on incoming traffic at the slave, wherein said means includes means for predicting an expected arrival time for the next packet at each slave based on a distribution of inter-arrival times for the previous packets received at that slave.

2. The system as claimed in claim 1, wherein said means for optimizing comprising Adaptive Probability based Polling interval (APPI) mechanism for adjusting the polling interval for each slave device in low power mode.

3. The system as claimed in claim 2, wherein said APPI mechanism comprises an APPI with fixed resolution or an APPI with adaptive resolution.

4. The system as claimed in claim 2, wherein said means for predicting the expected arrival time comprises:

means for learning a number of data bursts that arrive at each slave in particular ranges of inter-arrival times, means for estimating a probability density function of the traffic distribution at each slave, and means for determining the expected time interval for an arrival of the next data burst at each slave for which a probability of occurrence exceeds a defined threshold value.

5. The system as claimed in claim 4, wherein said means for learning the number of data bursts further comprises a means for receiving and storing the number of data bursts arriving in particular ranges of inter-arrival times in entries corresponding to said inter-arrival ranges.

6. The system as claimed in claim 4, wherein said means for estimating the probability density function further comprises a means for analyzing the distribution of data packets for different inter-arrival time durations.

7. The system as claimed in claim 4, wherein said means for determining the expected time interval for a defined threshold probability is described by:

$$P(t) = {}_0\Sigma^{T_{AS}} H(x) \leq P_{AS}$$

where $P(t)$ is a probability of arrival of a packet $T_{AS}$ is the inter-arrival time $P_{AS}$ is the threshold probability $H(x)$ is a function describing a number of observed inter-arrival times for each inter-arrival period normalized by a total number of observations.

8. The system as claimed in claim 2, wherein a slave is switched from active mode to low power mode based on a condition:

$$(T_{AS} - (T_{AS}/\text{deadline})) * P_{RECEIVE} + (T_{AS}/\text{deadline}) * P_{TRANSMIT} - T_{AS} * P_{LOW\ POWER} > P_{OVERHEAD}$$

where $T_{AS}$ is an expected inter-arrival time

Deadline is a deadline of service for the slaves in active mode $P_{RECEIVE}$ is a power in received mode $P_{LOW\ POWER}$ is a power in low power mode $P_{TRANSMIT}$ is a power in transmit mode $P_{OVERHEAD}$ is a power overhead of putting a connection into low power mode and reverting it to active mode.

9. The system as claimed in claim 2, wherein said mechanism for adjusting the polling interval in low power mode is based on a tolerance of a connection of delayed packets and is defined by:

$$P(t) = {}_0\Sigma^{T_P} H(x) \leq P_B$$

where $P(t)$ is a probability of arrival of a packet $T_P$ is a polling interval of the slave in low power mode $P_B$ is a probability, which reflects the tolerance of the connection for delayed packets $H(x)$ is a function defining a number of observed inter-arrival times for each inter-arrival period normalized by a total number of observations.

10. The system as claimed in claim 2, wherein a slave is switched from low power mode to active mode based on a condition:

$$(b-1) * T_{LOW\ POWER} > d$$

where b = a measured burst length $T_{LOW\ POWER}$ = time in the low power mode d = estimated maximum delay of the last packet.

11. The system as claimed in claim 1, wherein said master driven time division duplex wireless network is a Bluetooth network in which said low power mode corresponds to a "SNIFF" mode.

12. A method for managing power consumption in a master driven time division duplex wireless network, said method comprising optimizing power consumption while maintaining quality of service requirements for end-to-end packet delay, by adjusting a polling interval for each slave based on incoming traffic at the slave, wherein said method further includes predicting of an expected arrival time for the next packet at each slave based on a distribution of inter-arrival times for the previous packets at that slave.

13. The method as claimed in claim 12, wherein said adjusting of the polling interval is accomplished using an Adaptive Probability based Polling Interval (APPI) method for adjusting the polling interval for each slave device in low power mode.

14. The method as claimed in claim 13, APPI method comprises an APPI with fixed resolution or an APPI with adaptive resolution.

15. The method as claimed in claim 13, wherein predicting of the expected arrival time comprises:

learning a number of data bursts that arrive at each slave in particular ranges of inter-arrival times, estimating a probability density function of the traffic distribution at each slave, and determining the expected time interval for an arrival of the next data burst at each slave for which a probability of occurrence exceeds a defined threshold value.

16. The method as claimed in claim 15, wherein said learning of the number of data bursts is accomplished by storing the number of data bursts arriving in particular ranges of inter-arrival times in entries corresponding to said inter-arrival ranges.

17. The method as claimed in claim 15, wherein said estimating of the probability density function is by analyzing the distribution of data packets for different inter-arrival time durations.

18. The method as claimed in claim 15, wherein said determining of the expected time interval for a defined threshold probability is described by:

$$P(t) = {}_0\Sigma^{T_{AS}} H(x) \leq P_{AS}$$

where

P(t) is a probability of arrival of a packet $T_{AS}$ is the inter-arrival time $P_{AS}$ is the threshold probability H(x) is a function describing a number of observed inter-arrival times for each inter-arrival period normalized by a total number of observations.

19. The method as claimed in claim 13, wherein a slave is switched from active mode to low power mode based on a condition:

$$(T_{AS} - (T_{AS}/\text{deadline})) * P_{RECEIVE} + (T_{AS}/\text{deadline}) * P_{TRANSMIT} - T_{AS} * P_{LOW\ POWER} > P_{OVERHEAD}$$

where $T_{AS}$ is an expected inter-arrival time

Deadline is a deadline of service for the slaves in active mode $P_{RECEIVE}$ is a power in received mode $P_{LOW\ POWER}$ is a power in low power mode $P_{TRANSMIT}$ is the power in Transmit mode $P_{OVERHEAD}$ is a power overhead of putting a connection into low power mode and reverting it to active mode.

20. The method as claimed in claim 13, wherein said method for adjusting the polling interval in low power mode is based on a tolerance of a connection of delayed packets and is defined by:

$$P(t) = {}_0\Sigma^{T_P} H(x) \leq P_B$$

where

P(t) is a probability of arrival of a packet $T_P$ is a polling interval of the slave in low power mode $P_B$ is a probability, which reflects the tolerance of the connection for delayed packets H(x) is a function defining a number of observed inter-arrival times for each inter-arrival period normalized by a total number of observations.

21. The method as claimed in claim 12, wherein a slave is switched from low power mode to active mode based on a condition:

$$(b-1) * T_{LOW\ POWER} > d$$

where b = a measured burst length $T_{LOW\ POWER}$ = time in the low power mode d = estimated maximum delay of the last packet.

22. The method as claimed in claim 12, wherein said master driven time division duplex wireless network is a Bluetooth network in which said low power mode corresponds to a "SNIFF" mode.

23. A computer program product comprising computer readable program code stored on computer readable storage medium embodied therein for managing power consumption in a master driven time division duplex wireless network comprising computer readable program code means for optimizing power consumption while maintaining quality of service requirements for end-to-end packet delay, by adjusting a polling interval for each slave based on incoming traffic at the slave, wherein said computer readable program code means includes computer readable program code means for predicting of an expected arrival time for the next packet at each slave based on a distribution of inter-arrival times for the previous packets at that slave.

24. The computer program product a claimed in claim 23, wherein said computer readable program code means for optimizing comprises an Adaptive Probability based Polling Interval (APPI) mechanism for adjusting the polling interval for each slave device in low power mode.

25. The computer program product as claimed in claim 24, APPI mechanism comprises an APPI with fixed resolution or an APPI with adaptive resolution.

26. The computer program product as claimed in claim 24, wherein said computer readable program code means for predicting the expected arrival time comprises:

computer readable program code means for learning a number of data bursts that arrive at each slave in particular ranges of inter-arrival times, computer readable program code means for estimating a probability density function of the traffic distribution at each slave, and computer readable program code means for determining the expected time interval for an arrival of the next data burst at each slave for which a probability of occurrence exceeds a defined threshold value.

27. The computer program product as claimed in claim 26, wherein said computer readable program code means for learning the number of data bursts stores the number of data burst arriving in particular ranges of inter-arrival times in entries corresponding to said inter-arrival ranges.

28. The computer program product as claimed in claim 26, wherein the computer readable program code means for estimating the probability density function analyzes the distribution of data packets for different inter-arrival time durations.

29. The computer program product as claimed in claim 24, wherein said computer readable program code means for estimating the expected time interval for a defined threshold probability is defined by:

$$P(t) = {}_0\Sigma^{T_{AS}} H(x) \leq P_{AS}$$

where

P(t) is a probability of arrival of a packet $T_{AS}$ is the inter-arrival time $P_{AS}$ is the threshold probability H(x) is a function describing a number of observed inter-arrival times for each inter-arrival period normalized by a total number of observations.

30. The computer program product as claimed in claim 24, wherein a slave is switched from active mode to low power mode based on a condition:

$$((T_{AS} - (T_{AS}/\text{deadline})) * P_{RECEIVE} + (T_{AS}/\text{deadline}) * P_{TRANSMIT} - T_{AS} * P_{LOW\ POWER} > P_{OVERHEAD}$$

where $T_{AS}$ is an expected inter-arrival time

Deadline is a deadline of service for the slaves in active mode $P_{RECEIVE}$ is a power in received mode $P_{LOW\ POWER}$ is a power in low power mode $P_{TRANSMIT}$ is a power in transmit mode $P_{OVERHEAD}$ is a power overhead of putting a connection into low power mode and reverting it to active mode.

31. The computer program product as claimed in claim 24, wherein the mechanism for adjusting the polling interval in low power mode is based on a tolerance of a connection of delayed packets and is defined by:

$$P(t) = {}_0\Sigma^{T_P} H(x) \leq P_B$$

where $P(t)$ is a probability of arrival of a packet $T_P$ is a polling interval of the slave in low power mode $P_B$ is a probability, which reflects the tolerance of the connection for delayed packets $H(x)$ is a function defining a number of observed inter-arrival times for each inter-arrival period normalized by a total number of observations.

32. The computer program product as claimed in claim 24, wherein a slave is switched from low power mode to active mode based on a condition:

$$(b-1) * T_{LOW\ POWER} > d$$

where b = a measured burst length $T_{LOW\ POWER}$ = time in the low power mode d = estimated maximum delay of the last packet.

33. The computer program product as claimed in claim 23, wherein said master driven time division duplex wireless network is a Bluetooth network in which said low power mode corresponds to a "SNIFF" mode.

* * * * *